United States Patent
Latapie et al.

(10) Patent No.: US 12,510,752 B2
(45) Date of Patent: Dec. 30, 2025

(54) REAL-TIME ADAPTATION OF HOLOGRAPHIC IMAGING BASED ON A PHYSICAL ENVIRONMENT USING A REASONING ENGINE

(71) Applicant: Cisco Technology, Inc., San Jose, CA (US)

(72) Inventors: Hugo Latapie, Long Beach, CA (US); Hazim Hashim Dahir, Wake Forest, NC (US); Angelo Fienga, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 1140 days.

(21) Appl. No.: 17/323,136

(22) Filed: May 18, 2021

(65) Prior Publication Data

US 2022/0373795 A1   Nov. 24, 2022

(51) Int. Cl.
| | |
|---|---|
| *G02B 27/01* | (2006.01) |
| *G03H 1/00* | (2006.01) |
| *G06N 5/04* | (2023.01) |
| *H04L 65/401* | (2022.01) |
| *H04N 7/14* | (2006.01) |
| *G06T 7/00* | (2017.01) |

(52) U.S. Cl.
CPC ....... *G02B 27/0103* (2013.01); *G03H 1/0005* (2013.01); *G06N 5/04* (2013.01); *H04L 65/4015* (2013.01); *H04N 7/147* (2013.01); *G06T 7/00* (2013.01)

(58) Field of Classification Search
USPC .......................................................... 706/46
See application file for complete search history.

(56) References Cited

U.S. PATENT DOCUMENTS

| | | | |
|---|---|---|---|
| 9,749,367 B1 | 8/2017 | Kirby et al. | |
| 10,887,197 B2 | 1/2021 | Fenoglio et al. | |
| 10,965,516 B2 | 3/2021 | Fenoglio et al. | |
| 12,015,758 B1 * | 6/2024 | Vondran, Jr. | H04N 13/344 |
| 2005/0052714 A1 * | 3/2005 | Klug | G03H 1/268 |
| | | | 359/3 |

(Continued)

OTHER PUBLICATIONS

Hariharan, S., "Advanced Haptic and Holographic Interface for 3D Video Calling", International Journal of Advances in Electronics and Computer Science, ISSN: 2393-2835 vol. 2, Issue-12, Dec. 2015, 5 pages.

(Continued)

*Primary Examiner* — Reza Nabi
(74) *Attorney, Agent, or Firm* — Lee & Hayes, P.C.

(57) ABSTRACT

In one embodiment, a device transmits data characterizing a holographic image to a physical environment. A visible rendering of the holographic image is created in the physical environment. The device uses a reasoning engine to make an inference regarding a state of the physical environment based on sensor data captured in the physical environment indicative of one or more real-time characteristics of the physical environment. In response to the inference, the device adjusts the holographic image. Then, the device transmits data characterizing the adjusted holographic image to the physical environment, and a visible rendering of the adjusted holographic image is created in the physical environment.

20 Claims, 14 Drawing Sheets

(56) References Cited

U.S. PATENT DOCUMENTS

| | | | | |
|---|---|---|---|---|
| 2008/0246759 | A1* | 10/2008 | Summers | G06F 3/0304 |
| | | | | 348/E7.083 |
| 2010/0231999 | A1* | 9/2010 | Kroll | G02B 26/005 |
| | | | | 359/290 |
| 2019/0028674 | A1 | 1/2019 | Smits | |
| 2019/0098255 | A1 | 3/2019 | Bergmann et al. | |
| 2019/0325654 | A1* | 10/2019 | Stisser | A63F 13/26 |
| 2020/0255026 | A1* | 8/2020 | Katardjiev | G08G 1/096741 |
| 2020/0257245 | A1* | 8/2020 | Linville | G03H 1/2249 |
| 2020/0304758 | A1 | 9/2020 | Valli | |
| 2020/0356350 | A1* | 11/2020 | Penland | G06F 8/34 |
| 2021/0042532 | A1 | 2/2021 | Latapie et al. | |
| 2021/0174155 | A1 | 6/2021 | Smith et al. | |
| 2021/0225186 | A1* | 7/2021 | Yang | G06V 40/171 |
| 2021/0248789 | A1* | 8/2021 | Du | G06F 16/9538 |
| 2021/0279615 | A1 | 9/2021 | Latapie et al. | |
| 2021/0368308 | A1* | 11/2021 | Katardjiev | H04L 67/131 |
| 2021/0390423 | A1 | 12/2021 | Latapie et al. | |
| 2022/0044480 | A1* | 2/2022 | Zavesky | G06T 15/20 |
| 2022/0167068 | A1* | 5/2022 | Zavesky | H04N 21/8133 |
| 2022/0257333 | A1* | 8/2022 | Haider | G06F 3/013 |
| 2022/0373795 | A1* | 11/2022 | Latapie | H04L 65/403 |
| 2023/0377280 | A1* | 11/2023 | Melchner | G06T 19/006 |

OTHER PUBLICATIONS

"Holo-Meetings—DVE Holographic", online: http://dveholographics.com/holo-meetings/, accessed Feb. 16, 2021, 8 pages, Digital Video Enterprises, Inc.
Masuda, et al., "Computer Generated Holography Using a Graphics Processing Unit", Jan. 2006, vol. 14, No. 2, 6 pages, Optics Express.
Ferrone, Harrison, "The Making of Designing Holograms", online: https://docs.microsoft.com/en-us/windows/mixed-reality/discover/designing-holograms, Nov. 2020, 18 pages, Microsoft.
Bushwick, Sophie, "New Virtual Reality Interface Enables 'Touch' Across Long Distances", Nov. 2019, 7 pages, Scientific American.
Orts-Escolano, et al., "Holoportation: Virtual 3D Teleportation in Real-Time", 29th ACM User Interface Software and Technology Symposium (UIST), Oct. 2016, 14 pages, ACM.
Bach, et al., "The Hologram in My Hand:How Effective is Interactive Exploration of 3D Visualizations in Immersive Tangible Augmented Reality?", IEEE Transactions on Visualization and Computer Graphics ( vol. 24, Issue: 1, Jan. 2018), pp. 457-567, IEEE.
Gaudenzi, Anna, "StartupItalia Live! Holograms and Phigital events: we talk about it with Agostino Santoni and Valerio De Molli", Oct. 2020, 6 pages, StartupItalia.eu.
Kim, et al., "3D Room Geometry Reconstruction Using Audio-Visual Sensors", 2017 International Conference on 3D Vision (3DV), Oct. 2017, pp. 621-629, IEEE.
Reicherter, et al., "Fast digital hologram generation and adaptive force measurement in liquid-crystal-display-based holographic tweezers", Applied Optics vol. 45, No. 5, Feb. 10, 2006, pp. 888-896, Optical Society of America.
Agrawal, et al., "VQA: Visual Question Answering", Proceedings of the IEEE International Conference on Computer Vision (ICCV), 2015, 25 pages, arXiv:1505.00468v7 [cs.CL].
Aleksander, Igor, "Machine consciousness" In Scholarpedia. 3(2):4162, Oct. 21, 2011, 7 pages.
Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.
Baudrillard, Jean, "Simulacra and Simulation", 1981, 159 pages, Galilee.
Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.
Bělohlávek, Radim, "Concept lattices and order in fuzzy logic", Annals of Pure and Applied Logic 128 (2004) 277-298, Elsevier.
Box, G. E. P., "Science and Statistics", In Journal of the American Statistical Association, 71(356), Dec. 1976, pp. 791-799.
Chalmers, David J., "The Conscious Mind: In Search of a Fundamental Theory", 1996, 433 pages, Oxford University Press, New York.
Chella, et al., "A cognitive framework for imitation learning", Robotics and Autonomous Systems 54, Mar. 2006, pp. 403-408, Elsevier.
Chella, et al., "Artificial Consciousness", Chapter 20, In Perception—Action Cycle, 2011, pp. 637-671, Springer, New York.
Chella, et al., "Machine Consciousness: A Manifesto for Robotics", In International Journal of Machine Consciousness, 1(1), Jun. 2009, pp. 33-51, World Scientific Publishing Company.
Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.
Cui, et al., "A survey on network embedding", IEEE Transactions on Knowledge and Data Engineering, vol. 31, Issue: 5, May 1, 2019, pp. 833-852, IEEE.
De Bono, Edward, "The Mechanism of Mind", 1967, 276 pages, Penguin Books.
Düntsch, et al., "Modal-style operators in qualitative data analysis", 2002 IEEE International Conference on Data Mining, 2002. Proceedings, Dec. 2002, pp. 155-162, IEEE, Maebashi City, Japan.
Franco, et al., "Grocery product detection and recognition", Expert Systems With Applications 81 (2017), pp. 163-176, Elsevier Ltd.
Gärdenfors, Peter, "Conceptual Spaces: The Geometry of Thought", 2000, 398 pages, MIT Press.
George, et al., "Recognizing Products: A Per-exemplar Multi-label Image Classification Approach", ECCV 2014, Part II, LNCS 8690, 2014, pp. 440-455, Springer International Publishing Switzerland.
Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.
Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.
Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.
Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.
Hamilton, et al., "Representation Learning on Graphs: Methods and Applications", Bulletin of the IEEE Computer Society Technical Committee on Data Engineering, 2017, 23 pages, IEEE.
Hammer, et al., "A Reasoning Based Model for Anomaly Detection in the Smart City Domain", IntelliSys 2020, AISC 1251, pp. 144-159, 2021, Springer Nature Switzerland AG.
Hobbs, Jerry R., "Granularity", In Proceedings of the Ninth International Joint Conference on Artificial Intelligence, 1985, pp. 432-435, Morgan Kaufmann.
Horowitz, Alexandra, "Smelling themselves: Dogs investigate their own odours longer when modified in an "olfactory mirror" test", Behavioural Processes, 2017, 41 pages.
Johnson, Mark, "The Body in The Mind", 1987, 268 pages, The University of Chicago Press.
Kiryati, et al., "A probabilistic Hough transform", Pattern Recognition. 24(4), 1991, pp. 303-316, The Pattern Recognition Society.
Korzybski, Alfred, "Manhood of Humanity, The Science and Art of Human Engineering", 1921, 240 pages, E. P. Dutton & Company, New York, NY.
Korzybski, Alfred, "Science and Sanity: An Introduction to Non-Aristotelian Systems and General Semantics", 5th Edition, 1994, 910 pages, Institute of General Semantics, New York, NY.

(56) References Cited

OTHER PUBLICATIONS

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.

Ma, et al., "Granular computing and Dual Galois Connection", Information Sciences, 177(23), 2007, pp. 5365-5377, Elsevier Inc.

Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.

Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.

Pauli, Wolfgang, "Part I. General: (A) theory. Some relations between electrochemical behaviour and the structure of colloids", Jan. 1935, pp. 11-27, Transactions of the Faraday Society, vol. 1.

Scarselli, et al., "The Graph Neural Network Model", IEEE Transactions on Neural Networks (vol. 20, Issue: 1, Jan. 2009), pp. 61-80, IEEE.

Searle, John R., "The Rediscovery of the Mind", 1992, 104 pages, MIT Press.

Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "CODAM: A neural network model of consciousness", Neural Networks 20 (2007), pp. 983-992, Elsevier Ltd.

Taylor, J. G., "William James on Consciousness Beyond the Margin", 1996, 231 pages, Princeton University Press.

Thórisson, et al., "Cumulative Learning", Artificial General Intelligence—12th International Conference, AGI 2019, Proceedings, pp. 198-208, Springer.

Thorisson, Kristinn R., "A New Constructivist AI: From Manual Methods to Self-Constructive Systems", Chapter 9, Apr. 2012, pp. 147-174, Atlantis Press Book.

Thórisson, Kristinn R., "Integrated AI Systems", Minds & Machines 17, Mar. 2007, pp. 11-25.

Tonioni, et al., "Product recognition in store shelves as a sub-graph isomorphism problem", online: https://arxiv.org/abs/1707.08378, Sep. 2017, 14 pages.

Unger, et al., "The Singular Universe and the Reality of Time: A Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, Pei, "Rigid Flexibility—The Logic of Intelligence", Draft for Comment, Feb. 8, 2004, 329 pages, mindspring.com.

Wang, et al. "Self in NARS, an AGI System", vol. 5, Article 20, Mar. 2018, 15 pages, Frontiers in Robotics and AI.

Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: An Approach Based on Heirarchies of Concepts", I. Rival (Ed.), Ordered Sets, 1982, pp. 314-339.

Yao, et al., "A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

REAL-TIME ADAPTATION OF HOLOGRAPHIC IMAGING BASED ON A PHYSICAL ENVIRONMENT USING A REASONING ENGINE

TECHNICAL FIELD

The present disclosure relates generally to computer networks, and, more particularly, to the real-time adaptation of holographic imaging based on a physical environment using a reasoning engine.

BACKGROUND

The share of the workforce that is working from home has increased dramatically in recent times. Collaboration between remote employees remains necessary, however. As a result, videoconferences have become a common and valuable resource for many businesses.

Various solutions for enhancing the immersiveness and interactivity of videoconferences have been explored, including so-called "phygital" meetings which blend digital or virtual elements with physical elements to create a more realistic meeting experience akin to a real-life conference room. Phygital meetings often involve creating digital representations of physical objects, such as holographic images, augmented reality images, virtual reality images, mixed reality images, and the like, and then projecting the digital content into a remote physical space or environment. However, the alignment of a hologram and the physical environment to which it is projected can often result in misalignments that are noticeable to a viewer. For instance, the hologram for a virtual attendee of a phygital meeting may appear to pass through a physical object or not come into contact with a certain object, such as a chair.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
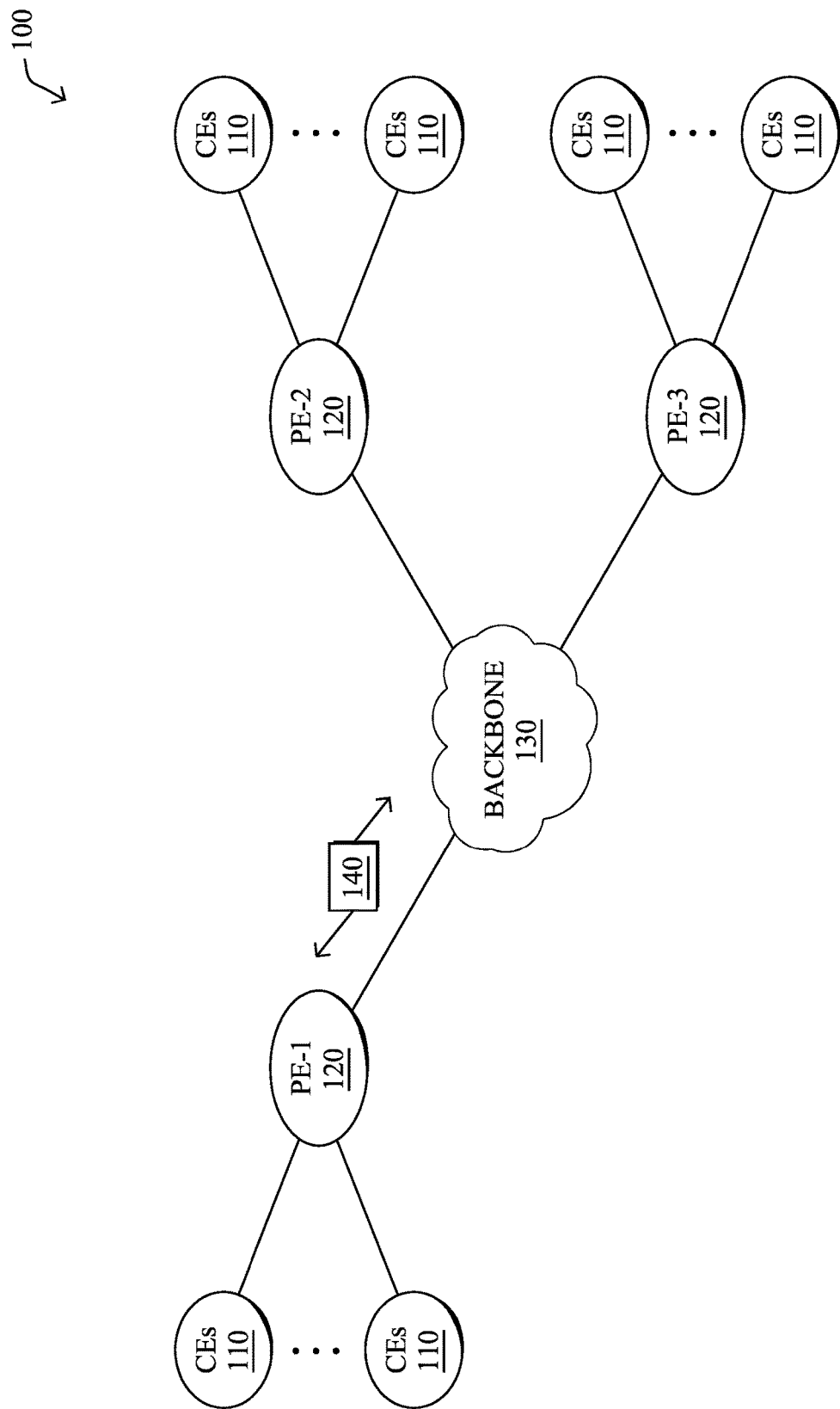
FIGS. 1A-1B illustrate an example computer network.

According to one or more embodiments of the disclosure, a device transmits data characterizing a holographic image to a physical environment. A visible rendering of the holographic image is created in the physical environment. The device uses a reasoning engine to make an inference regarding a state of the physical environment based on sensor data captured in the physical environment indicative of one or more real-time characteristics of the physical environment. In response to the inference, the device adjusts the holographic image. Then, the device transmits data characterizing the adjusted holographic image to the physical environment, and a visible rendering of the adjusted holographic image is created in the physical environment.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
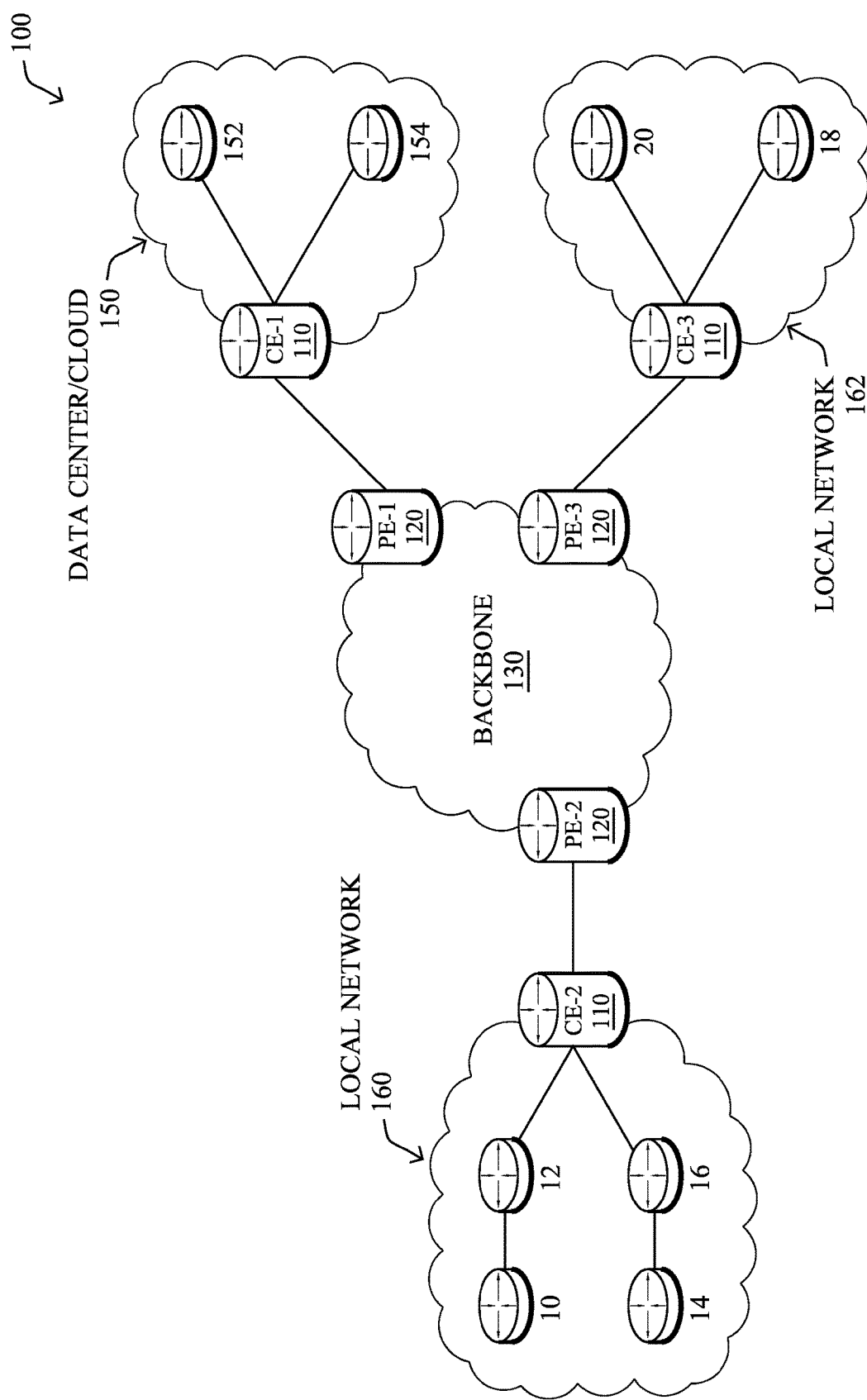

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 1015

10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
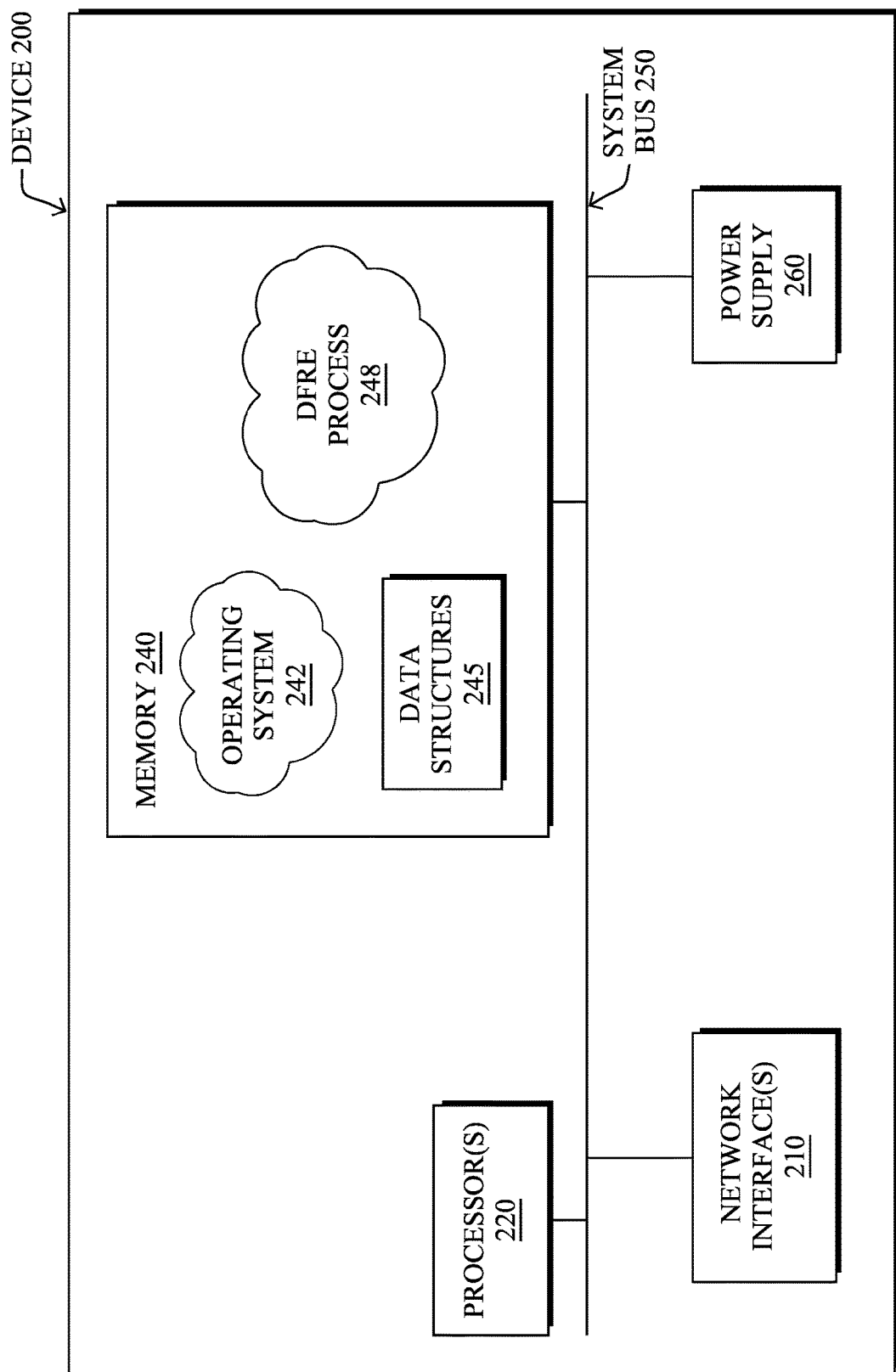
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to provide cognitive reasoning services to a network. In various embodiments, DFRE process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
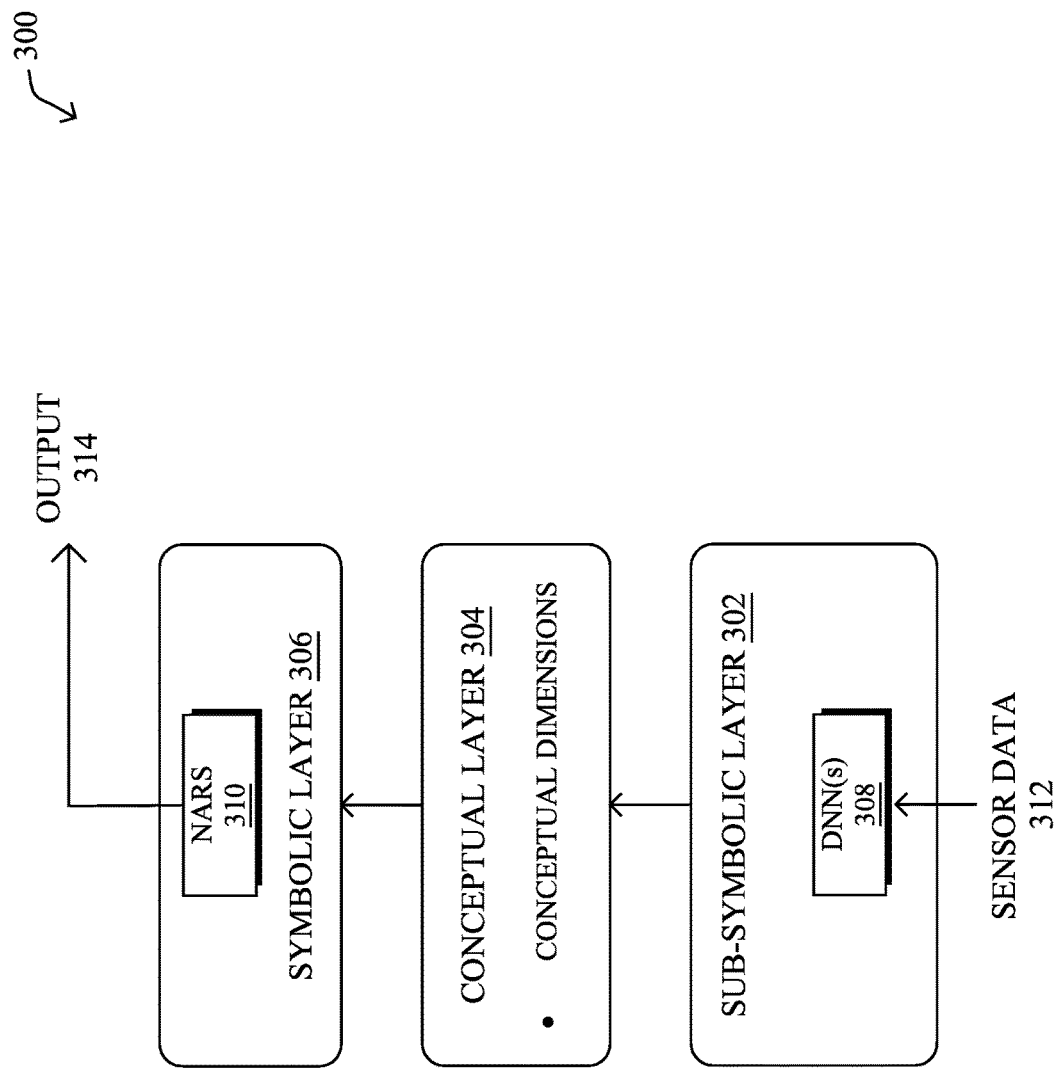
FIG. 3 illustrates an example hierarchy for a deep fusion reasoning engine (DFRE)

According to various embodiments, FIG. 3 illustrates an example hierarchy 300 of a deep fusion reasoning engine (DFRE). For example, DFRE process 248 shown in FIG. 2 may execute a DFRE for any number of purposes. In particular, DFRE process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for real-time adaptation of holographic imaging, as described in detail herein.

In general, a reasoning engine, also known as a 'semantic reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a DFRE is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

In other words, a DFRE generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Figure 4:
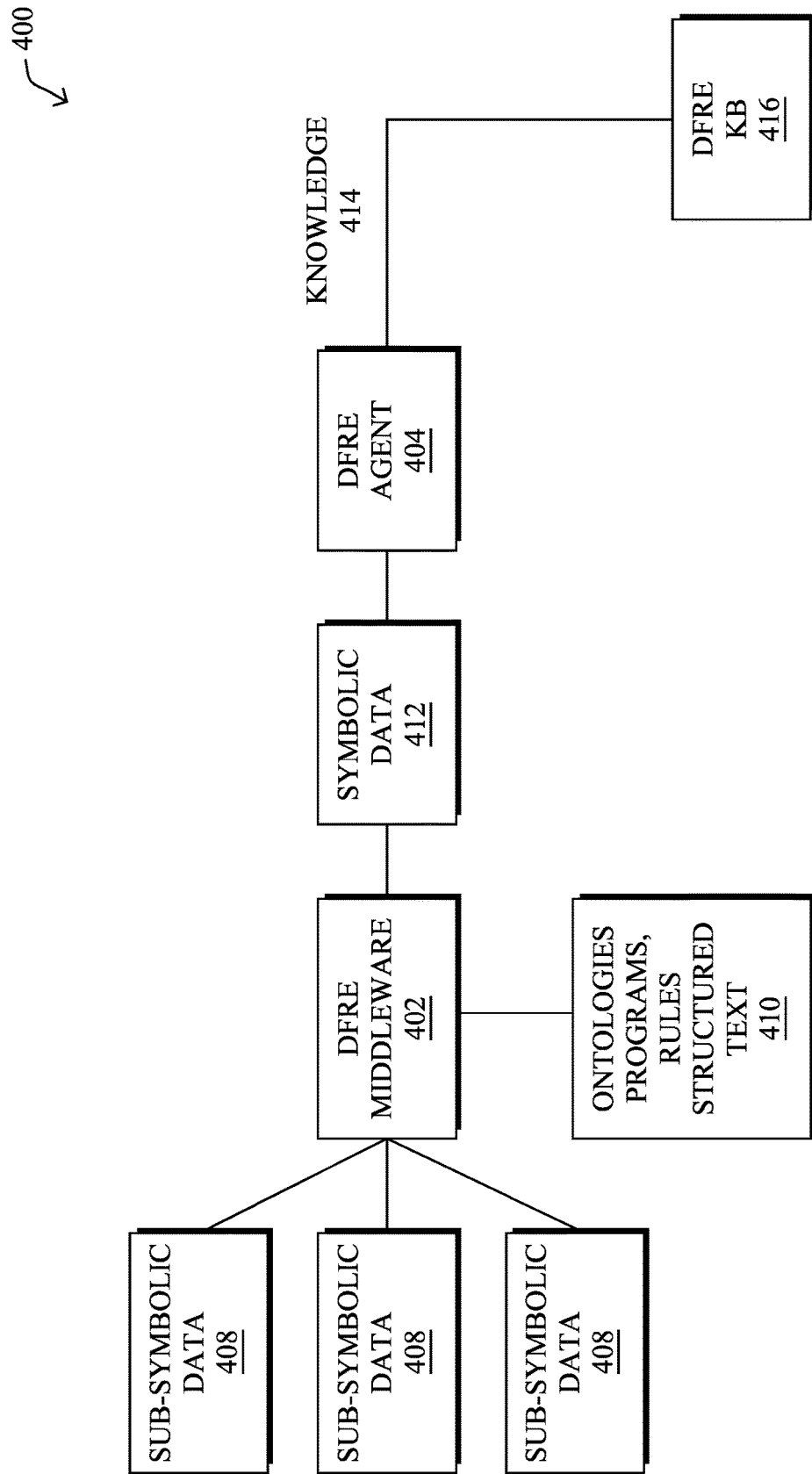
FIG. 4 illustrates an example DFRE architecture.

According to various embodiments, FIG. 4 illustrates an example DFRE architecture 400. As shown, architecture 400 may be implemented across any number of devices or fully on a particular device, as desired. At the core of architecture 400 may be DFRE middleware 402 that offers a collection of services, each of which may have its own interface. In general, DFRE middleware 402 may leverage a library for interfacing, configuring, and orchestrating each service of DFRE middleware 402.

In various embodiments, DFRE middleware 402 may also provide services to support semantic reasoning, such as by an AIKR reasoner. For example, as shown, DFRE middleware 402 may include a NARS agent that performs semantic reasoning for structural learning. In other embodiments, OpenCog or another suitable AIKR semantic reasoner could be used.

One or more DFRE agents 404 may interface with DFRE middleware 402 to orchestrate the various services available from DFRE middleware 402. In addition, DFRE agent 404 may feed and interact with the AIKR reasoner so as to populate and leverage a DFRE knowledge graph with knowledge.

More specifically, in various embodiments, DFRE middleware 402 may obtain sub-symbolic data 408. In turn, DFRE middleware 402 may leverage various ontologies, programs, rules, and/or structured text 410 to translate sub-symbolic data 408 into symbolic data 412 for consumption by DFRE agent 404. This allows DFRE agent 404 to apply symbolic reasoning to symbolic data 412, to populate and update a DFRE knowledge base (KB) 416 with knowledge 414 regarding the problem space (e.g., the network under observation, etc.). In addition, DFRE agent 404 can leverage the stored knowledge 414 in DFRE KB 416 to make assessments/inferences.

For example, DFRE agent 404 may perform semantic graph decomposition on DFRE KB 416 (e.g., a knowledge graph), so as to compute a graph from the knowledge graph of KB 416 that addresses a particular problem. DFRE agent 404 may also perform post-processing on DFRE KB 416, such as performing graph cleanup, applying deterministic rules and logic to the graph, and the like. DFRE agent 404 may further employ a definition of done, to check goals and collect answers using DFRE KB 416.

In general, DFRE KB 416 may comprise any or all of the following:
Data
Ontologies
Evolutionary steps of reasoning
Knowledge (e.g., in the form of a knowledge graph)
The Knowledge graph also allows different reasoners to:
  Have their internal subgraphs
  Share or coalesce knowledge
  Work cooperatively In other words, DFRE KB 416 acts as a dynamic and generic memory structure. In some embodiments, DFRE KB 416 may also allow different reasoners to share or coalesce knowledge, have their own internal sub-graphs, and/or work collaboratively in a distributed manner. For example, a first DFRE agent 404 may perform reasoning on a first sub-graph, a second DFRE agent 404 may perform reasoning on a second sub-graph, etc., to evaluate the health of the network and/or find solutions to any detected problems. To communicate with DFRE agent 404, DFRE KB 416 may include a bidirectional Narsese interface or other interface using another suitable grammar.

In various embodiments, DFRE KB 416 can be visualized on a user interface. For example, Cytoscape, which has its building blocks in bioinformatics and genomics, can be used to implement graph analytics and visualizations.

Said differently, DFRE architecture 400 may include any or all of the following the following components:
DFRE middleware 402 that comprises:
  Structural learning component
  JSON, textual data, ML/DL pipelines, and/or other containerized services (e.g., using Docker)
  Hierarchical goal support
DFRE Knowledge Base (KB) 416 that supports:
  Bidirectional Narsnareese interface
  Semantic graph decomposition algorithms Graph analytics
Visualization services
DFRE Agent 404
DFRE Control System
More specifically, in some embodiments, DFRE middleware 402 may include any or all of the following:
Subsymbolic services:
Data services to collect sub-symbolic data for consumption
Reasoner(s) for structural learning
NARS
OpenCog
Optimized hierarchical goal execution
Probabilistic programming
Causal inference engines
Visualization Services (e.g., Cytoscape, etc.)
DFRE middleware 402 may also allow the addition of new services needed by different problem domains.

Figure 5:
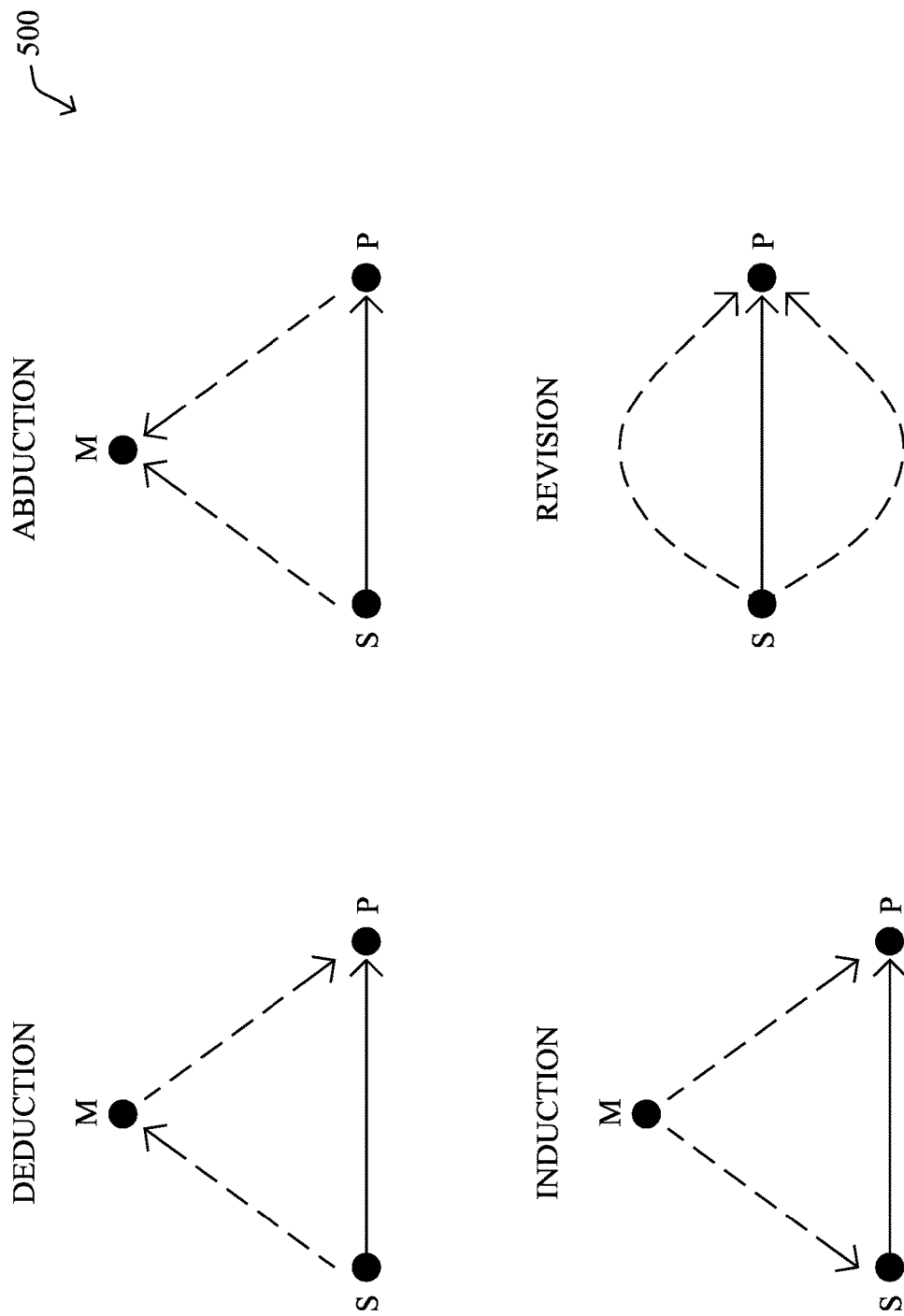
FIG. 5 illustrates an example of various inference types.
Figure 6:
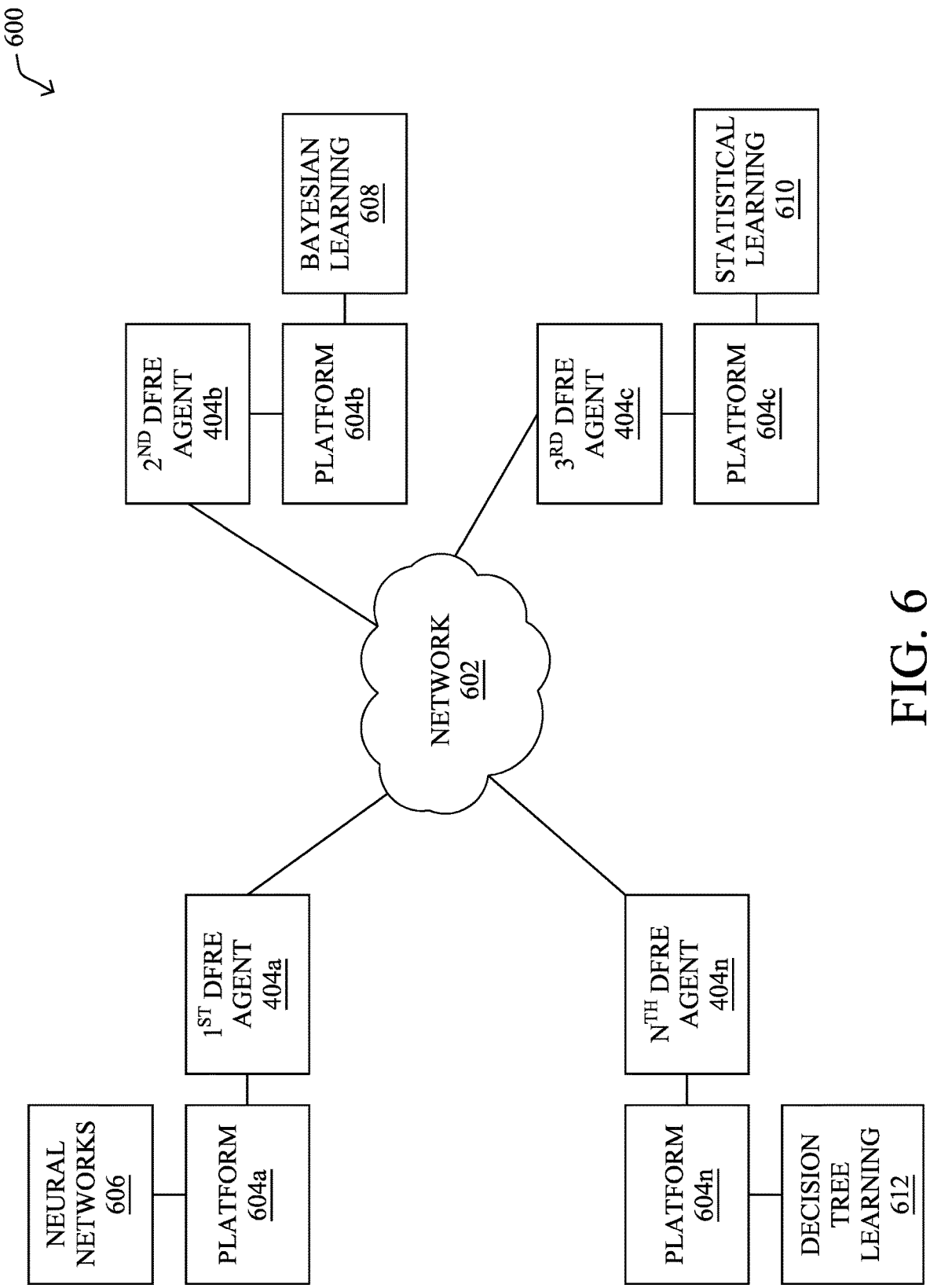
FIG. 6 illustrates an example architecture for multiple DFRE agents.

During execution, DFRE agent 404 may, thus, perform any or all of the following:
Orchestration of services
Focus of attention
Semantic graph decomposition
Addresses combinatorial issues via an automated divide and conquer approach that works even in non-separable problems because the overall knowledge graph 416 may allow for overlap.
Feeding and interacting with the AIKR reasoner via bidirectional translation layer to the DFRE knowledge graph.
Call middleware services
Post processing of the graph
Graph clean-up
Apply deterministic rules and logic to the graph
Definition of Done (DoD)
Check goals and collect answers FIG. 5 illustrates an example 500 showing the different forms of structural learning that the DFRE framework can employ. More specifically, the inference rules in example 500 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the DFRE may support any or all of the following:
Syllogistic Logic
Logical quantifiers
Various Reasoning Types
Deduction Induction
Abduction
Induction
Revision
Different Types of Inference
Local inference
Backward inference To address combinatorial explosion, the DFRE knowledge graph may be partitioned such that each partition is processed by one or more DFRE agents 404, as shown in FIG. 6, in some embodiments. More specifically, any number of DFRE agents 404 (e.g., a first DFRE agent 404a through an $N^{th}$ DFRE agent 404n) may be executed by devices connected via a network 602 or by the same device. In some embodiments, DFRE agents 404a-404n may be deployed to different platforms (e.g., platforms 604a-604n) and/or utilize different learning approaches. For instance, DFRE agent 404a may leverage neural networks 606, DFRE agent 404b may leverage Bayesian learning 608, DFRE agent 404c may leverage statistical learning, and DFRE agent 404n may leverage decision tree learning 612.

As would be appreciated, graph decomposition can be based on any or all of the following:
Spatial relations—for instance, this could include the vertical industry of a customer, physical location (country) of a network, scale of a network deployment, or the like.
Descriptive properties, such as severity, service impact, next step, etc.
Graph-based components (isolated subgraphs, minimum spanning trees, all shortest paths, strongly connected components . . . )
Any new knowledge and related reasoning steps can also be input back to the knowledge graph, in various embodiments.

In further embodiments, the DFRE framework may also support various user interface functions, so as to provide visualizations, actions, etc. to the user. To do so, the framework may leverage Cytoscape, web services, or any other suitable mechanism.

Figure 7:
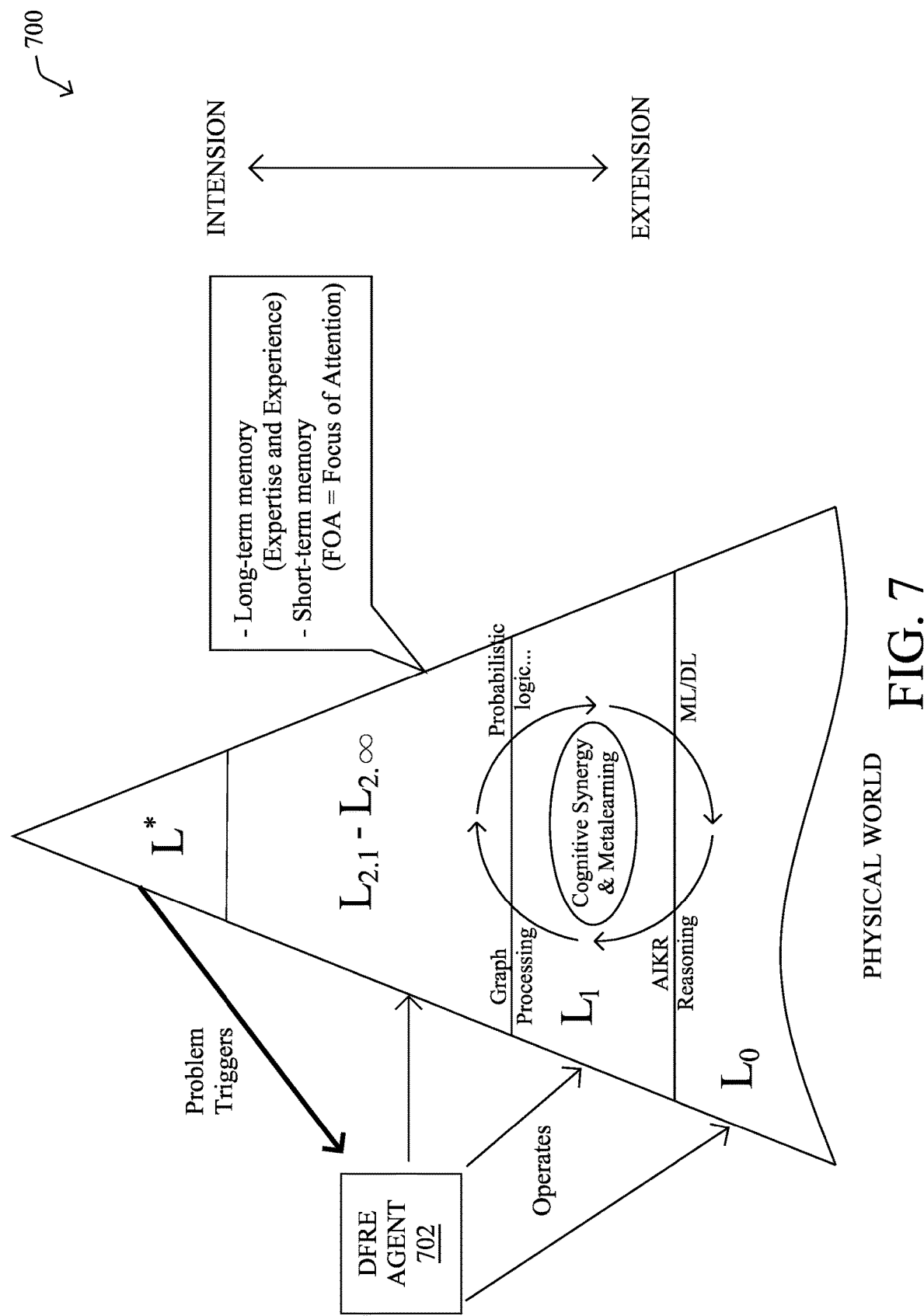
FIG. 7 illustrates an example DFRE metamodel.

At the core of the techniques herein is a knowledge representation metamodel 700 for different levels of abstraction, as shown in FIG. 7, according to various embodiments. In various embodiments, the DFRE knowledge graph groups information into four different levels, which are labeled $L_0$, $L_1$, $L_2$, and $L^*$ and represent different levels of abstraction, with $L_0$ being closest to raw data coming in from various sensors and external systems and $L_2$ representing the highest levels of abstraction typically obtained via mathematical means such as statistical learning and reasoning. $L^*$ can be viewed as the layer where high-level goals and motivations are stored. The overall structure of this knowledge is also based on anti-symmetric and symmetric relations.

One key advantage of the DFRE knowledge graph is that human level domain expertise, ontologies, and goals are entered at the $L_2$ level. This leads, by definition, to an unprecedented ability to generalize at the $L_2$ level thus minimizing the manual effort required to ingest domain expertise.

More formally:
$L^*$ represents the overall status of the abstraction. In case of a problem, it triggers problem solving in lower layers via a DFRE agent 702.
$L_{2.1}$-$L_{2.\infty}$=Higher level representations of the world in which most of concepts and relations are collapsed into simpler representations. The higher-level representations are domain-specific representations of lower levels.
$L_1$=has descriptive, teleological and structural information about $L_0$.
$L_0$=Object level is the symbolic representation of the physical world.

In various embodiments, $L_2$ may comprise both expertise and experience stored in long-term memory, as well as a focus of attention (FOA) in short-term memory. In other words, when a problem is triggered at $L^*$, a DFRE agent 702 that operates on $L_2$-$L_0$ may control the FOA so as to focus on different things, in some embodiments.

As would be appreciated, there may be hundreds of thousands or even millions of data points that need to be extracted at $L_0$. The DFRE's FOA is based on the abstraction and the DFRE knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), DFRE agent 702 can make evaluations regarding the particular system at different levels of extraction. Indeed, metamodel 700 may differ from a more traditional knowledge graph through the inclusion of any or all of the following, in various embodiments:

- A formal mechanism to represent different levels of abstraction, and for moving up and down the abstraction hierarchy (e.g., ranging from extension to intension).
- Additional structure that leverages distinctions/anti-symmetric relations, as the backbone of the knowledge structures.
- Similarity/symmetric relation-based relations.

As noted above, so-called "phygital" meetings, which blend digital or virtual elements with physical elements, have emerged recently as a solution for producing a more immersive and interactive remote meeting experience. Such meetings typically involve a digital image (e.g., holographic image, augmented reality image, virtual reality image, mixed reality image, etc.) that represents a physical object, such as a person or other article. The digital image is then projected into a remote physical environment so as to create the illusion that the physical object represented by the digital image is actually present within the remote environment. For example, a live holographic image of a keynote speaker located in a remote region may be projected onto the stage of a banquet hall in which a conference is set to take place. This permits audience members physically present at the conference to enjoy the keynote speaker's presentation as if he or she were also present in the space.

Figure 8A:
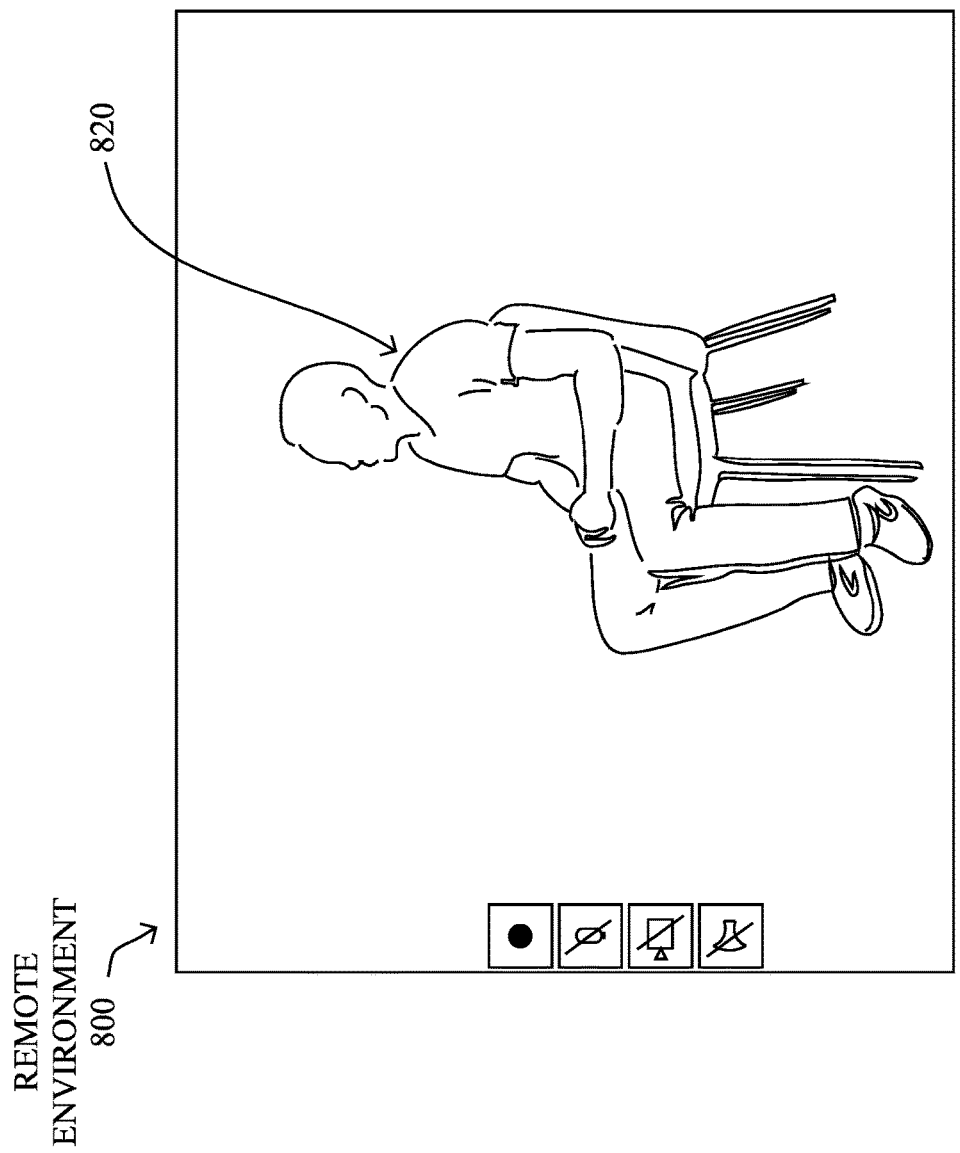
FIGS. 8A and 8B illustrate an example "phygital" meeting experience comprising physical and remote environments.
Figure 8B:
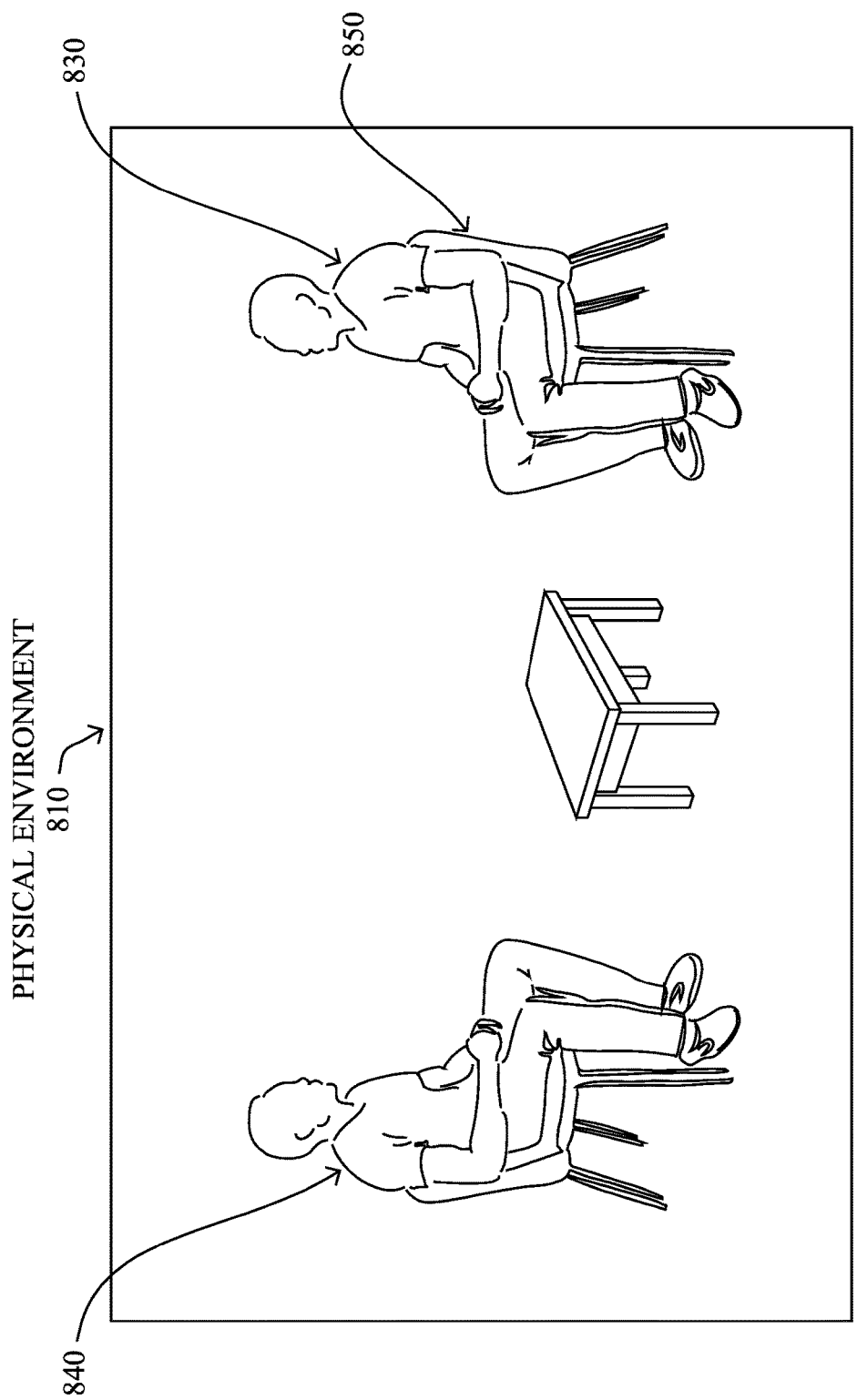

FIGS. 8A and 8B illustrate another example phygital meeting experience. Here, a remote environment 800, as shown in FIG. 8A, may include a remote human participant 820 who is the subject of a holographic image 830 that is projected in physical environment 810, as shown in FIG. 8B, across from a local human participant 840 who is physically present in physical environment 810. In some embodiments, various holographic imaging devices (e.g., cameras, microphones, infrared sensors, etc.) in remote environment 800 may be utilized to generate a holographic image of remote participant 820. The remote participant 820, who may be positioned in front of a green screen, for example, may sit, stand, or otherwise behave in a manner that is consistent with the meeting taking place in physical environment 810 so as to enhance the realism of the phygital meeting. For instance, if the holographic image 830 of remote participant 820 is projected in physical environment 810 so as to appear to sit on a chair 850 physically present in the physical environment, the remote participant 820 may assume a sitting position in the remote environment 800 shown in FIG. 8A. One or more projection devices in physical environment 810 may then project the sitting holographic image 830 onto chair 850, such that it appears the local participant 840 and remote participant 820 are having a face-to-face conversation in the physical environment 810 shown in FIG. 8B.

Generating a phygital setting that is realistic requires adapting the digital content to the environment in which it is projected. In the example of FIGS. 8A and 8B, the dimensions and positioning of the holographic image 830 must be tailored to match the chair 850 where the remote participant 820 is meant to sit. Problematically, the digital content is typically auto-consistent and cannot correlate with, or adapt to, the physical environment in which it is projected. The digital content may be created without taking into account characteristics of its physical projection environment and, as an example, may appear out of scale (e.g., too small or too large) or misaligned within the surrounding space.

Figure 9A:
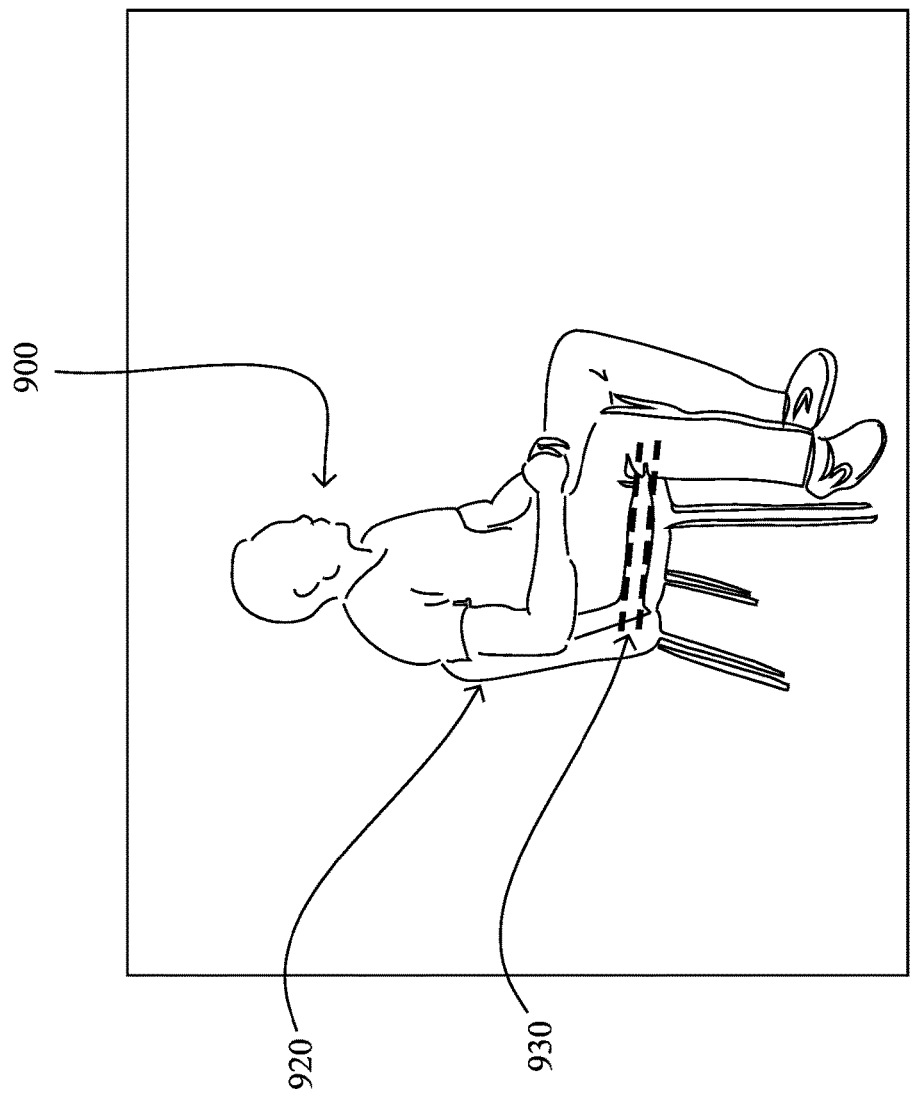
FIGS. 9A and 9B illustrate an example scenario in which a reasoning engine-based architecture is applied to perform real-time adaptation of a holographic image based on a physical environment.

For instance, FIG. 9A shows a non-adapted holographic image 900, which in this example is a visible rendering of a remotely located meeting participant (e.g., remote participant 820), may be projected in a physical environment (e.g., physical environment 810) that includes a chair 920. One or more projection devices in the physical environment may project the non-adapted holographic image 900 on or above the chair 920 so as to create the appearance that the remote participant is actually sitting on the chair which is located in the physical environment. As shown, however, the holographic image 900 has not been adapted to the physical environment in which it is projected, and therefore suffers from a misalignment 930 between the projected image 900 and the chair 920. The misalignment 930 in this case creates an effect such that the non-adapted holographic image 900 appears to be hovering over a surface of the chair 920, which detracts from the overall realism of the hologram projection, as would be appreciated.

In conventional implementations, misalignments between a digital element, such as a holographic image, augmented reality image, virtual reality image, mixed reality image, and so on, and a physical object located in a physical environment in which the digital element is projected typically arise because the digital element being projected has not been correlated or adapted with the physical environment in terms of size, position, physical state, and so on. Moreover, physical environments, such as meeting rooms, conference halls, and so forth, are constantly changing in multiple dimensions. People move about within the space, furniture is re-positioned, there may be environmental changes, such as temperature fluctuations, lighting adjustments, humidity shifts, variations of $CO_2$, etc., and so on, all of which occur in real-time and without warning.

Without operators making manual adjustments to the digital content, which can be both tedious and time-consuming, the projected images are unable to reflect or adapt to changes in the physical environment. As would be appreciated, manually adjusting the digital content is generally not a feasible way of accounting for the countless number of minute changes which can occur in the physical environment at any given time. Consequently, the remote environment, where the holographic image is generated, is unaware of real-time events or changes occurring in the physical environment, and the digital element cannot realistically react to those events or changes. The result is that the projected digital content cannot respond, or "adapt," to the changing physical environment as one might expect in real-life, which degrades the overall immersiveness of the experience.

Real-Time Adaptation of Holographic Imaging Based on a Physical Environment Using a Reasoning Engine The techniques herein introduce a reasoning engine-based system to enable real-time adaptation of a holographic image being projected into a physical environment based on changes occurring in the physical environment. In some aspects, sensors disposed within the physical "projection" environment may collect a variety of real-time measurements, and a reasoning engine, such as the DFRE illustrated herein, may be applied to the sensor data to make inferences regarding the current and changing state of the environment. In further aspects, the reasoning engine-based inferences may be used to construct a real-time geospatial model of the physical environment, which may be updated automatically as the environment changes. The model may then be used to adapt the holographic image to the real-time state of the physical environment. In another aspect, the reasoning engine may be applied to the sensor data to make inferences regarding an interaction between the visible rendering of the holographic image and a physical object in the environment. In response, feedback (e.g., audio-visual feedback, haptic feedback, etc.) may be generated within the environment.

Illustratively, the techniques described herein may be performed by hardware, software, and/or firmware, such as in accordance with the DFRE process 248, which may include computer executable instructions executed by the processor 220 (or independent processor of interfaces 210), to perform functions relating to the techniques described herein.

Specifically, according to various embodiments, a device transmits data characterizing a holographic image to a physical environment. A visible rendering of the holographic image is created in the physical environment. The device uses a reasoning engine to make an inference regarding a state of the physical environment based on sensor data captured in the physical environment indicative of one or more real-time characteristics of the physical environment. In response to the inference, the device adjusts the holographic image. Then, the device transmits data characterizing the adjusted holographic image to the physical environment, and a visible rendering of the adjusted holographic image is created in the physical environment.

Operationally, the techniques discussed herein allow for bi-directional collaboration on both "sides" of a "phygital" interaction, which entails a combination of physical elements (e.g., humans, objects, etc.) located in a physical environment and digital elements (e.g., holographic images) projected therein, though the digital elements may derive from elsewhere (e.g., a different physical environment, a remote server or database, etc.). This may be accomplished by enabling the physical and digital elements present in the physical environment, or meeting place, to fully interact with other physical or digital elements in real-time. Furthermore, these techniques enable the digital elements to adapt to real-time changes occurring within the physical environment.

Figure 10:
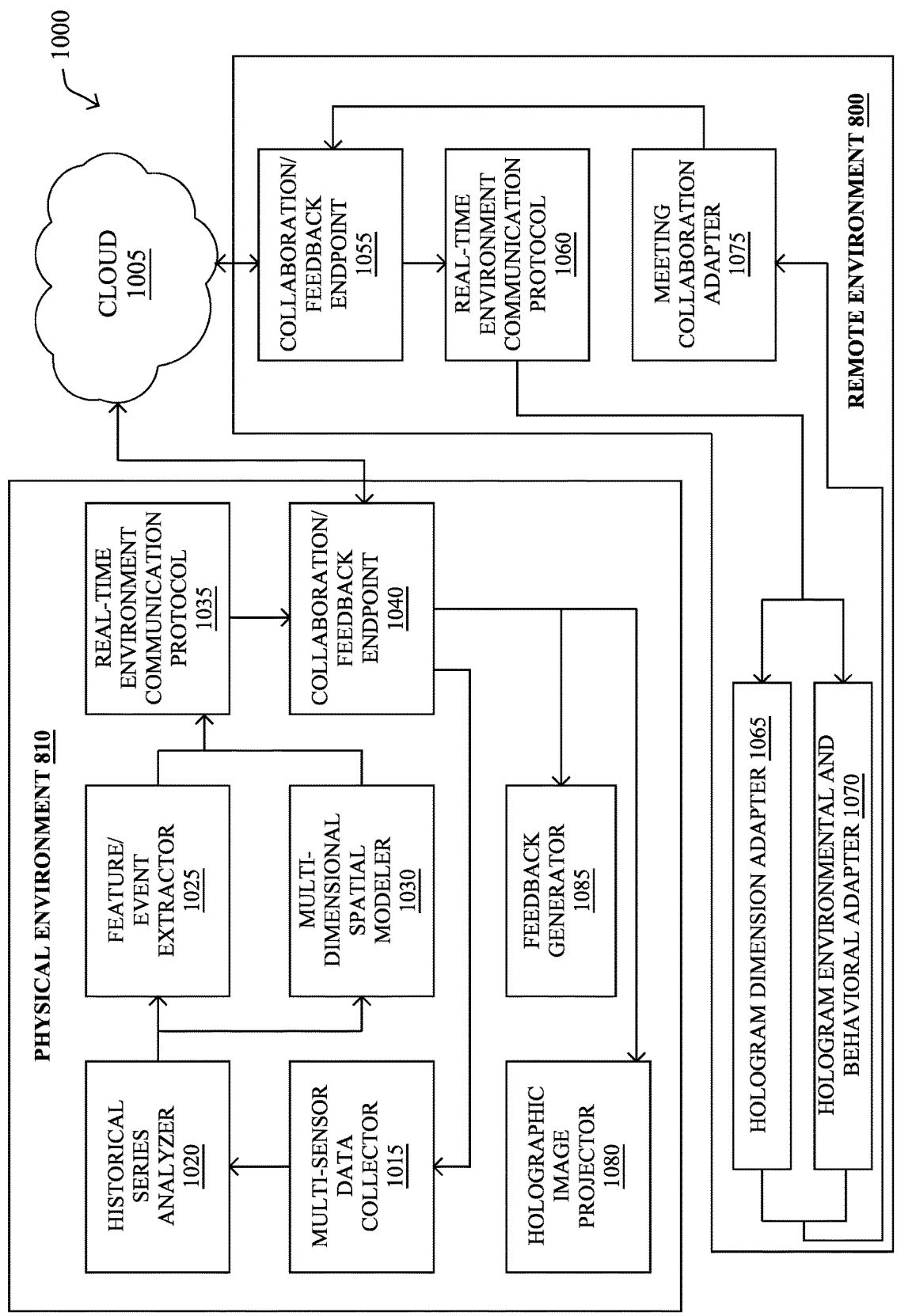
FIG. 10 illustrates an example reasoning engine-based architecture for real-time holographic imaging adaptation based on a physical environment.

With the above in mind, FIG. 10 illustrates an example reasoning engine-based architecture 1000 for real-time holographic imaging adaptation, according to various embodiments. As shown, architecture 1000 may include a physical environment 810 and a remote environment 800, each of which including various operational blocks as described below. Physical environment 810 may represent any physical environment, whether indoor or outdoor, enclosed or open, and so on, whereas remote environment 800 represents any location that is remote or separated from physical environment 810. In the example of a "phygital" meeting, for example, as demonstrated in FIGS. 8A and 8B, physical environment 810 and remote environment 800 may correspond to separate rooms, whereby a holographic image of a remote meeting participant who is physically present in the room of remote environment 800 is created and transmitted for projection in the room of physical environment 810. In other embodiments, physical environment 810 may correspond to a conference room or other physical space, while remote environment 800 may not correspond to a remote computing environment comprising one or more network devices (e.g., in the cloud, in the fog, etc.) configured to generate and transmit data characterizing a holographic image to physical environment 800.

Physical environment 810 and remote environment 800 may be communicatively connected in a variety of ways and is not limited to any one particular configuration. In some embodiments, the operational blocks of physical environment 810 and remote environment 800, respectively, may be communicatively connected via the cloud 1005 which may be, for example, data center/cloud environment 150, as described above and illustrated in FIG. 1B. Cloud 1005 may be implemented with a plurality of data servers, e.g., servers 152-154, in addition to any number and configuration of additional devices, as would be appreciated by a person of ordinary skill in the art. physical environment 810 and remote environment 800 may utilize cloud 1005 and its servers/devices for the transmission and reception of data in the manner described below. In other embodiments, the operational blocks of physical environment 810 and remote environment 800 may be located within the same local network (e.g., local network 160 or 162). Notably, the communication scheme between physical environment 810 and remote environment 800 may be symmetrical. Thus, during operation, data may be communicated continuously back and forth between both environments in the manner described below.

For illustration, the following non-limiting example is described, wherein one or more digital elements are generated in remote environment 800 and then transmitted to physical environment 810 for projection therein. Alternatively, the one or more digital elements may be generated in physical environment 810 and then transmitted to remote environment 800 for projection therein, in which case the principles described herein may simply be applied in a reverse manner.

The projectable digital elements may include, for example, holographic images, augmented reality images, virtual reality images, mixed reality images, and the like. Holographic images, e.g., holographic image 830, are referenced primarily throughout the example below, but the principles described herein may apply equally to other types of digital elements, as well. The holographic images may be projected in physical environment 810 using any suitable techniques known in the art, such as, for example, laser-based projection, Pepper's ghost effect, projection screens, and so forth.

Referring first to the configuration of physical environment 810, the functionality of physical environment 810 may be carried out by a set of operational blocks, i.e., blocks 1015 through 1040. It should be appreciated that the various blocks shown may be combined or omitted, as desired, consistent with the claims defined herein. Execution of operational blocks 1015 through 1040 may be carried out in a variety of ways. For example, the operational blocks of physical environment 810 may be implemented locally on a single device (e.g., node/device 200) or distributed over multiple such devices across one or more networks. In the distributed case, operational blocks 1015 through 1040 may be viewed as a single device, for purposes of implementing the functionality of physical environment 810. Moreover, each of the operational blocks of physical environment 810 may leverage a reasoning engine, such as the deep fusion reasoning engine (e.g., DFRE process 248) described in detail above, by utilizing inferences generated by the reasoning engine as described below.

In a first aspect of physical environment 810, multi-sensor data collector 1015 may gather sensor data from sensors and/or sensor aggregation devices disposed within physical environment 810. Any number and type of sensors may be disposed in physical environment 810 such as, for example, video/image cameras, microphones, environmental sensors (e.g., for measuring temperature, air quality, oxygen and $CO_2$ levels, ambient light, etc.), motion sensors, ultrasonic sensors, infrared sensors, thermal sensors, and so forth. In essence, the sensor data captured by the various sensors in physical environment 810 may be indicative of any real-time characteristics of the physical environment. Real-time characteristics of the physical environment are not limited to any type of characteristics and may include, for example, a person moving about in the environment, an object (e.g., furniture, a plant, a glass, etc.) being moved or changing in its dimensions, a sound emission, a temperature change, an increase or decrease of light, $CO_2$ fluctuations, and so forth. These characteristics can then be analyzed using a reasoning engine to adapt a holographic image to physical environment 810 in which the image is being projected, as described later below.

In certain embodiments, multi-sensor data collector 1015 may process and organize the collected sensor data before transmitting the collected data to the subsequent operational block. For instance, multi-sensor data collector 1015 may aggregate the sensor data according to specific criteria, such as data type (e.g., motion-related information, lighting levels, etc.), sensor type or restricting data collection to particular sensors only, time of data capture, location (e.g., specific region(s) of the physical environment), etc. In further embodiments, multi-sensor data collector 1015 may tag the collected sensor data (e.g., time tagging, location tagging, data type tagging, etc.).

Next, historical series analyzer 1020 may receive the collected sensor data (optionally processed as described above) from multi-sensor data collector 1015. The sensor data may encapsulate a defined period of time in physical environment 810. Thus, historical series analyzer 1020 may be operable to analyze the "history" of physical environment 810 over said period of time to identify patterns or trends occurring in the environment. Such patterns may later be used in remote environment 800 to adapt a holographic image to changing conditions in physical environment 810. Any number or type of patterns may be identified by historical series analyzer 1020. For example, the collected sensor data may indicate patterns such as linear growth in $CO_2$ saturation, temperature variation in a specific location of the physical environment 810, an increase or decrease in lighting, movement of an object, and so on.

Furthermore, historical series analyzer 1020 may leverage a reasoning engine, such as DFRE process 248, to identify such patterns in the sensor data. Referring briefly to FIG. 3, for example, DFRE hierarchy 300 may receive sensor data 312 and generate output 314 indicative of patterns identified in sensor data 312. Based on such output, historical series analyzer 1020 may enrich the metadata sets corresponding to the collected sensor data so as to identify and label said patterns. The pattern-enriched metadata, optionally along with the raw sensor data, may then be transmitted for use by both feature/event extractor 1025 and multi-dimensional spatial modeler 1030.

In certain embodiments, historical series analyzer 1020 may construct a data model representative of physical environment 810 based upon the sensor data received from multi-sensor data collector 1015, whereby said model characterizes the patterns identified by historical series analyzer 1020. The constructed data model may be passed onto feature/event extractor 1025 and multi-dimensional spatial modeler 1030, which may further modify/enhance the model based on its own processing, as described below. Thus, one or more operational blocks of physical environment 810 may work together to build one or more data models representative of physical environment 810 that is provided to real-time environment communication protocol 1035 for interpretation, and ultimately sent to remote environment 800 for adapting a holographic image to real-time characteristics in the physical environment.

Feature/event extractor 1025 may process the enriched metadata (or data model), optionally along with the raw sensor data, received from historical series analyzer 1020 and extract events or actions from such data that are changing the context (i.e., real-time characteristics) of physical environment 810. For example, based upon patterns identified in the collected sensor data, feature/event extractor 1025 may detect any number or type of events happening in physical environment 810, such as a person taking a cup of tea, a ball rolling on a desk, lights being turned on, and so on. In some embodiments, feature/event extractor 1025 may also utilize the sensor data and pattern-enriched metadata to detect interactions between a physical entity (e.g., person, object, etc.) present in physical environment 810 and a holographic image being projected in physical environment 810. For instance, historical series analyzer 1020 may detect a person in physical environment 810 attempting to shake hands with a holographic image representative of another person (e.g., a person located in remote environment 800), the holographic image coming into contact with a physical object (e.g., the holographic image sitting in a chair in the physical environment 810), and so on.

In further embodiments, feature/event extractor 1025 may geo-reference or geo-locate the extracted events or actions within physical environment 810. In other words, feature/event extractor 1025 may identify specific events occurring in physical environment 810, as well as specific locations in physical environment 810 where the events are occurring. Feature/event extractor 1025 may leverage the reasoning engine, such as DFRE process 248, to identify the events and geo-references associated with said events, as would be appreciated. Consequently, feature/event extractor 1025 may modify/enhance the aforementioned data model so as to indicate the extracted events, along with any geo-references associated with the events, and transmit the updated model to real-time environment communication protocol 1035.

Meanwhile, multi-dimensional spatial modeler 1030 may also receive the enriched metadata (or data model) from historical series analyzer 1020. Multi-dimensional spatial modeler 1030 may use such data to create a geo-spatial model of the context of physical environment 810. As an example, using cameras and ultrasonic sensors disposed throughout physical environment 810, multi-dimensional spatial modeler 1030 may generate a three-dimensional (3D) model of physical environment 810 having precise spatial reference with respect to the holographic image being projected in the environment. The 3D model may be further enriched using the historical data received from historical series analyzer 1020, which may be indicative of patterns or changes occurring in the physical environment, as well as other data such as temperature (measured using thermal sensors) and environmental data (e.g., light, gas levels, etc.). Multi-dimensional spatial modeler 1030 may leverage inferences made by the reasoning engine, such as DFRE process 248, regarding collected sensor data and pattern data to construct the geo-spatial model of physical environment 810, as would be appreciated.

In some embodiments, multi-dimensional spatial modeler 1030 may update the geo-spatial model in response to real-time changes happening in physical environment 810. For example, if a chair is moved, a person enters the room, a light is turned off, a thermostat is adjusted, or the like, multi-dimensional spatial modeler 1030 may adjust the geo-spatial model of physical environment 810 to reflect the up-to-date context of the environment. In further embodiments, multi-dimensional spatial modeler 1030 may utilize inferences made by the reasoning engine regarding a state of physical environment 810 (e.g., according to collected sensor data, pattern-enriched metadata, etc.). Based upon the reasoning engine-derived inferences, multi-dimensional spatial modeler 1030 may detect a change in the state of physical environment 810, and in response, update the geo-spatial model of physical environment 810 accordingly. The resulting model may then be transmitted to real-time environment communication protocol 1035.

Upon receiving the aforementioned models from feature/event extractor 1025 and multi-dimensional spatial modeler 1030, real-time environment communication protocol 1035 may encapsulate the data models and send the encapsulated data to remote environment 800 via collaboration/feedback endpoint 1040, which is operable to communicate with collaboration/feedback endpoint 1055 of remote environment 800 (e.g., indirectly through cloud 1005, directly through a local network, etc.). In some embodiments, real-time environment communication protocol 1035 may construct a single, final data model representative of the real-time context of physical environment 810, incorporating aspects of each data model received from feature/event extractor 1025 and multi-dimensional spatial modeler 1030, respectively. In further embodiments, real-time environment communication protocol 1035 may convert the data model to a format recognizable by the operational blocks of remote environment 800 so that the data model can be readily processed and utilized to adapt the holographic image being sent from the remote environment.

Collaboration/feedback endpoint 1040, which receives the resultant model from real-time environment communication protocol 1035, may be operable to communicate with collaboration/feedback endpoint 1055 of remote environment 800, as noted above. In some embodiments, collaboration/feedback endpoints 1040 and 1055 may be designed specifically for engaging with each other to enable seamless, real-time collaboration across remote locations (e.g., Cisco® Collaboration Endpoints, Webex® Rooms, etc.). Accordingly, collaboration/feedback endpoints 1040 and 1055 may be configured to symmetrically communicate data back and forth to enable collaboration across physical environment 810 and remote environment 800 (e.g., to create a "phygital" meeting, as described herein).

In particular, collaboration/feedback endpoint 1040 may receive data characterizing a holographic image ("holographic image data") to be projected in physical environment 810 from collaboration/feedback endpoint 1055 of remote environment 800. As described above, one or more digital elements may be generated in remote environment 800 and then transmitted to physical environment 810 for projection therein. Alternatively, the holographic image to be transmitted may be obtained by remote environment 800, but generated elsewhere. In either event, collaboration/feedback endpoints 1040 and 1055 may communicate with each other, as shown in FIG. 10, so that collaboration/feedback endpoint 1055 may transmit the holographic image data to collaboration/feedback endpoint 1040.

Upon receipt of the holographic image data, collaboration/feedback endpoint 1040 may be operable to cause the creation of a visible rendering of the holographic image (e.g., holographic image 830) in physical environment 810. In some embodiments, collaboration/feedback endpoint 1040 may send the holographic image data to holographic image projector 1080 for projection. Holographic image projector 1080 may comprise any number and type of devices suitable for the creation or projection of a holographic image known in the art. Similarly, holographic image projector 1080 may project the holographic image in physical environment 810 using any suitable techniques known in the art, such as, for example, laser-based projection, Pepper's ghost effect, projection screens, and so forth. In some embodiments, collaboration/feedback endpoint 1040 may control the projection of the holographic image by holographic image projector 1080 in a defined manner. For instance, if the holographic image received at physical environment 810 is a representation of a person in a seated position, collaboration/feedback endpoint 1040 may instruct holographic image projector 1080 to project the holographic image upon a particular chair (e.g., chair 850) located in physical environment 810 so as to create the appearance that the hologram is seated inside the physical environment 810 along with other human participants.

An example "phygital" meeting experience is illustrated in FIGS. 8A and 8B, as referenced above. One or more projection devices (e.g., holographic image projector 1080) in physical environment 810, which may be controlled by collaboration/feedback endpoint 1040 according to some embodiments, may project a sitting holographic image 830 onto chair 850. Consequently, it appears that the local participant 840 and the remote participant 820 shown in FIG. 8A are having a face-to-face conversation in physical environment 810, as demonstrated in FIG. 8B.

A problem may arise, however, if the projection of the holographic image 830 does not correctly align with the chair 850 on which the digitally represented remote participant 820 is supposed to sit (e.g., see FIG. 9A). The techniques described herein may address this misalignment issue by adapting the holographic image 830 to aspects of the physical environment 810, such as the specific positioning of chair 850 or other physical object in the physical environment, or events that take place in real-time in the physical environment, as explained below.

Referring next to the configuration of remote environment 800, the functionality of remote environment 810 may be carried out by a set of operational blocks, i.e., blocks 1055 through 1075. It should be appreciated that the various blocks shown may be combined or omitted, as desired, consistent with the claims defined herein. Execution of operational blocks 1055 through 1075 may be carried out in a variety of ways. For example, the operational blocks of remote environment 800 may be implemented locally on a single device (e.g., node/device 200) or distributed over multiple such devices across one or more networks. In the distributed case, operational blocks 1055 through 1075 may be viewed as a single device, for purposes of implementing the functionality of remote environment 800. Moreover, each of the operational blocks of remote environment 800 may leverage a reasoning engine, e.g., DFRE process 248, by utilizing inferences generated by the reasoning engine as described below.

Generally speaking, remote environment 800 may transmit data characterizing one or more digital content items, such as a holographic image, to physical environment 810 for projection therein. In some embodiments, the remote environment 800 may represent a physical environment (e.g., conference room, office, etc.) separated from physical environment 810, and the holographic image may be generated based upon a subject (e.g., person, object, etc.) physically present in the remote environment 800. The remote environment 800 may transmit the corresponding holographic image data to physical environment 810, which then may project the holographic image at a location therein such that it appears the subject located in the remote environment 800 is concurrently present in physical environment. In other embodiments, remote environment 800 may not represent a physical space in which a hologram subject is located, but rather a remote computing environment including a set of computing devices configured to obtain data characterizing a holographic image. In either event, a model of a holographic image ("holographic image model") is accessed by the remote environment 800 (e.g., stored locally at remote environment 800, accessible at a remote storage location, etc.), and holographic image data based on the holographic image model may be provided from remote environment 800 to physical environment 810 for projection therein. Conversely, the data model(s) characterizing the real-time state of the physical environment ("physical environment data model") may be provided from physical environment 810 to remote environment 800 for the purpose of adapting the holographic image thereto in the following manner.

In a first aspect of remote environment 800, collaboration/feedback endpoint 1055 may be operable to communicate with collaboration/feedback endpoint 1040 of physical environment 810, as noted above. In some embodiments, collaboration/feedback endpoint 1055 may receive a data model characterizing a real-time state of physical environment 810 from collaboration/feedback endpoint 1040. The data model may be generated based upon sensor data collected in physical environment 810, which is indicative of real-time characteristics therein, as well as analysis of said data performed physical environment-side including pattern identification, feature/event extraction, 3D geo-spatial model construction, and so on, each of which is described in detail above.

Collaboration/feedback endpoint 1055 may provide the physical environment data model to real-time environment communication protocol 1060 for processing. The physical environment data model may be analyzed for the purpose of adapting or updating the holographic image data responsive to real-time changes happening in the physical environment (e.g., a person taking a cup of tea, a ball rolling on a desk, lights being turned on, etc.). To this end, real-time environment communication protocol 1060 may extract relevant data from the received physical environment data model for processing by dual holographic image data adaptation blocks: hologram dimension adapter 1065 and hologram environmental and behavioral adapter 1070. These blocks may operate to ensure that the holographic image data, as projected in physical environment 810, maintains an appearance and behavior that is realistic in light of various characteristics of physical environment 810. In some embodiments, real-time environment communication protocol 1060 may convert the physical environment data model to a format that is recognizable by the aforementioned operational blocks.

In a manner similar to feature/event extractor 1025 and multi-dimensional spatial modeler 1030, hologram dimension adapter 1065 and hologram environmental and behavioral adapter 1070 may each utilize the data received from real-time environment communication protocol 1060 to construct one or more adapted holographic image models according to the following processing operations. The data model(s), representing an adjusted holographic image, may then be provided to meeting collaboration adapter 1075 which interprets and combines the data model(s) for eventual transmission back to physical environment 810, as described in detail below.

Firstly, hologram dimension adapter 1065 may receive the physical environment data model from real-time environment communication protocol 1060 and based upon such information, construct an adapted holographic image model that has been adapted to the various dimensions of physical environment 810. Initially, the objective of hologram dimension adapter 1065 may include determining the dimensionality of various features within physical environment 810 (e.g., based on computations performed by multi-dimensional spatial modeler 1030, as referenced above). There may be numerous objects within physical environment 810 that have dimensions relevant to ensuring the dimensionally accurate projection of the holographic image. As such, hologram dimension adapter 1065 may extract dimension information for any number of objects in physical environment 810 from the received holographic image data. For example, assuming the projected hologram is a representation of a person, hologram dimension adapter 1065 may determine the dimensionality of physical environment 810 including the dimensions of a chair or a table at which the projected hologram is intended to sit in physical environment 810, dimensions of one or more meeting participants nearby the projected hologram and physically present in physical environment 810, dimensions of an object (e.g., a cup, a plant, a lectern, etc.) with which the projected hologram may interact, dimensions of the room itself which comprises the physical environment 810, and so on.

Using these extracted dimensions, hologram dimension adapter 1065 may construct the adapted holographic image model such that the visible rendering of the holographic conforms to the dimensionality of physical environment 810 as described above. Doing so can ensure that the holographic image projection in physical environment 810 is accurate rather than out-of-scale (i.e., too large, too small, etc.). In particular, hologram dimension adapter 1065 may adjust, when necessary, dimensional aspects of the adapted holographic image model based upon the dimensionality of physical environment 810 (based on the constructed geo-spatial model of physical environment 810 referenced above), such that the respective dimensions of the holographic image and aspects of physical environment 810 are in conformity. The resulting model may then be transmitted to meeting collaboration adapter 1075.

Secondly, hologram environmental and behavioral adapter 1070 may also receive the physical environment data model from real-time environment communication protocol 1060 and based upon such information, construct an adapted holographic image model that has been adapted to environmentally and behaviorally to physical environment 810. Initially, the objective of hologram environmental and behavioral adapter 1070 may include identifying events or actions occurring in physical environment 810 that change the context (i.e., real-time characteristics) of physical environment 810 (e.g., based on computations performed by feature/event extractor 1025, as referenced above). Notably, environmental and behavioral adapter 1070 may apply a reasoning engine, e.g., DFRE process 248, to the received physical environment data model. The reasoning engine, using the techniques described in detail above, may infer the state of physical environment 810, based upon the physical environment data model. These inferences regarding the state of physical environment 810 may include any number and type of actions or events occurring in the physical environment 810 such as, for example, a person taking a cup of tea, a ball rolling on a desk, lights being turned on, etc. As would be appreciated, certain events or actions that transpire in physical environment 810 may impact the physical entities (e.g., people, objects, etc.) present in the environment. In order to ensure a sense of realism and immersiveness, these events or actions should also impact the holographic image that is projected in physical environment 810 in a similar manner.

Thus, using the inferences made by the reasoning engine regarding the state of physical environment 810, in conjunction with the physical environment data model received from real-time environment communication protocol 1060 (based on sensor data captured in physical environment 810), hologram environmental and behavioral adapter 1070 may detect particular events or actions that have occurred in physical environment 810. Moreover, hologram environmental and behavioral adapter 1070 may use the reasoning engine's inferences for the purpose of detecting a change in the state of physical environment 810. Based on the state of physical environment 810, or in response to a change in said state of physical environment 810, hologram environmental and behavioral adapter 1070 may construct the adapted holographic image model correspondingly, so that the visible rendering of the holographic image projected in physical environment 810 has adapted to the real-time characteristics of the physical environment.

As an example, assume remote environment 800 sends a holographic image of a plant to physical environment 810 for projection therein. Assume further that environmental sensors that measure levels of $CO_2$ are disposed inside physical environment 810. The sensor data collected in physical environment 810 may be processed (e.g., by multi-sensor data collector 1015, historical series analyzer 1020, feature/event extractor 1025, multi-dimensional spatial modeler 1030, and/or real-time environment communication protocol 1035, as explained above) and used to construct the physical environment data model that is eventually provided to remote environment 800. If the reasoning engine is applied to the received physical environment data model and infers an increase in $CO_2$ saturation (e.g., above a predefined threshold) in physical environment 810, hologram environmental and behavioral adapter 1070 may adapt or adjust the holographic image model so as to reflect the change in $CO_2$ saturation. A change in $CO_2$ saturation may cause, for example, the color of a plant's leaves to change from yellow to green. Accordingly, hologram environmental and behavioral adapter 1070 may adjust the holographic image model such that the leaves thereof turn green, as if the plant whose image is projected in physical environment 810 is actually physically present therein. The adapted holographic image model may then be transmitted back to physical environment 810 for projection therein, as described in further detail below.

In some embodiments, the reasoning engine, using the techniques described in detail above, may also infer an interaction between a physical object (e.g., a person, a chair, a table, a lectern, etc.) located in physical environment 810 and the visible rendering of the holographic image. More specifically, the reasoning engine may infer that a physical object located in physical environment 810 comes into contact, or is about to come into contact, with the visible rendering of the holographic image in physical environment 810. As would be appreciated, certain interactions between a physical object and the subject of the holographic image would produce a sensory reaction (i.e., a physical sensation) that extends beyond a change in the appearance of the holographic image, if the subject of the holographic image were actually present in the physical environment (the appearance of the holographic image should also adapt to such interactions, e.g., in the manner described above).

For instance, assume the subject of the holographic image being projected in the physical environment 810 is a remote participant located in remote environment 800, and a user physically present in physical environment 810 reaches out her hand to shake the hand of the holographic image. The reasoning engine may infer, based on the real-time physical environment data model provided to remote environment 800, that the handshake is occurring, or about to occur. With the benefit of such knowledge, hologram environmental and behavioral adapter 1070 may determine that sensory feedback mimicking the familiar sensation of a handshake should be produced in physical environment 810. One aspect of such feedback may include, for example, touch or haptic feedback, to mimic the feeling of shaking another person's hand. This feedback could be implemented in various ways, such as, for example, actuating an ultrasound emitter (e.g., feedback generator 1085 in physical environment 810) to generate ultrasonic waves that create a haptic sensation in the user's hand as it comes into contact with the visible rendering of the holographic image—specifically, the holographic image's hand—thereby simulating the tactile sensation of an actual handshake.

In another example, assume the subject of the holographic image being projected in the physical environment 810 is an interactive object, such as a globe, and a user physically present in physical environment 810 attempts to touch and rotate the holographic globe. The reasoning engine may infer, based on the real-time physical environment data model provided to remote environment 800, that contact between the user's hand and the holographic globe is occurring, or about to occur. With the benefit of such knowledge, hologram environmental and behavioral adapter 1070 may determine that sensory feedback mimicking the sensation of a hand touching a globe should be produced in physical environment 810. Furthermore, the reasoning engine may also infer that the interaction would cause a change of a physical state of the holographic image in physical environment 810—i.e., the user's hand should cause rotation of the holographic globe, based on the specific motion of the user's hand as it contacts the surface of the globe. Therefore, in this example, hologram environmental and behavioral adapter 1070 may construct the adapted holographic image model such that the visible rendering of the holographic image reflects the changed physical state thereof based on the rotation inferred by the reasoning engine (i.e., the visible rendering of the holographic globe in physical environment 810 appears to have rotated in a realistic manner), in addition to enabling sensory feedback in the form a haptic sensation in the user's hand as it comes into contact with the visible rendering of the holographic image (e.g., using an ultrasound emitter).

Upon determining that a feedback event may be generated based on an interaction between the visible rendering of the holographic image in physical environment 810 and a physical object in physical environment 810, hologram environmental and behavioral adapter 1070 may generate data characterizing the feedback event ("feedback event data") and provide the same to meeting collaboration adapter 1075 for transmission to collaboration/feedback endpoint 1040 of physical environment 810. Hologram environmental and behavioral adapter 1070 may encompass the feedback event data in the adapted holographic image data model that is sent to meeting collaboration adapter 1075, or the feedback event data and the adapted holographic image data model may be sent to meeting collaboration adapter 1075 separately.

Furthermore, in the event that a feedback event is generated in the manner explained above, collaboration/feedback endpoint 1040 may be operable to cause the generation of the feedback event in physical environment 810 as dictated by the adapted holographic image model and feedback event data received from remote environment 800. In some embodiments, physical environment 810 may be equipped with one or more devices communicatively coupled with collaboration/feedback endpoint 1040 that are capable of generating various types of sensory feedback to further enhance the realism of the "phygital" experience. To this end, collaboration/feedback endpoint 1040 may send the feedback event data to feedback generator 1085 for the generation of one or more corresponding feedback events in physical environment 810. Feedback generator 1085 may comprise any number and type of devices suitable for providing "feedback," as defined herein, in physical environment 810 such as, for example, ultrasound emitters for providing haptic/touch feedback, audio speakers for providing auditory feedback, and so on.

After constructing the adapted holographic image model to reflect any events or actions extracted from the physical environment data model, and optionally adding feedback event data based on hologram-physical object interactions as described above, hologram environmental and behavioral adapter 1070 may send the resultant model to meeting collaboration adapter 1075, which also receives the adapted holographic image model from hologram dimension adapter 1065, as explained above. Meeting collaboration adapter 1075 may then process these data models, which have been adapted to real-time characteristics of physical environment 810 both in terms of dimensions and behaviors/events. In some embodiments, meeting collaboration adapter 1075 may encapsulate the adapted holographic image models and send the encapsulated data to physical environment 810 via collaboration/feedback endpoint 1055, which is operable to communicate with collaboration/feedback endpoint 1040 of physical environment 810, as described above. In further embodiments, meeting collaboration adapter 1075 may construct a single, final adapted data model representative of all adaptations calculated by hologram dimension adapter 1065 and hologram environmental and behavioral adapter 1070. In yet further embodiments, meeting collaboration adapter 1075 may convert the data model to a format recognizable by the operational blocks of physical environment 810 so that the adapted holographic image model can be readily projected in the physical environment.

Collaboration/feedback endpoint 1055, which receives the resultant adapted model from meeting collaboration adapter 1075, may be operable to communicate with collaboration/feedback endpoint 1040 of physical environment 810, as explained above. In this way, communication between physical environment 810 and remote environment 800 may be viewed as symmetrical, whereby physical environment 810 provides remote environment 800 with data characterizing real-time characteristics of physical environment 810, while remote environment 800 provides physical environment 810 with data characterizing a holographic image model that has been adapted to the real-time characteristics of physical environment 810. One or more projection devices (e.g., holographic image projector 1080) in physical environment 810 may then produce a visible rendering of the adapted/adjusted holographic image in physical environment 810.

Figure 9B:
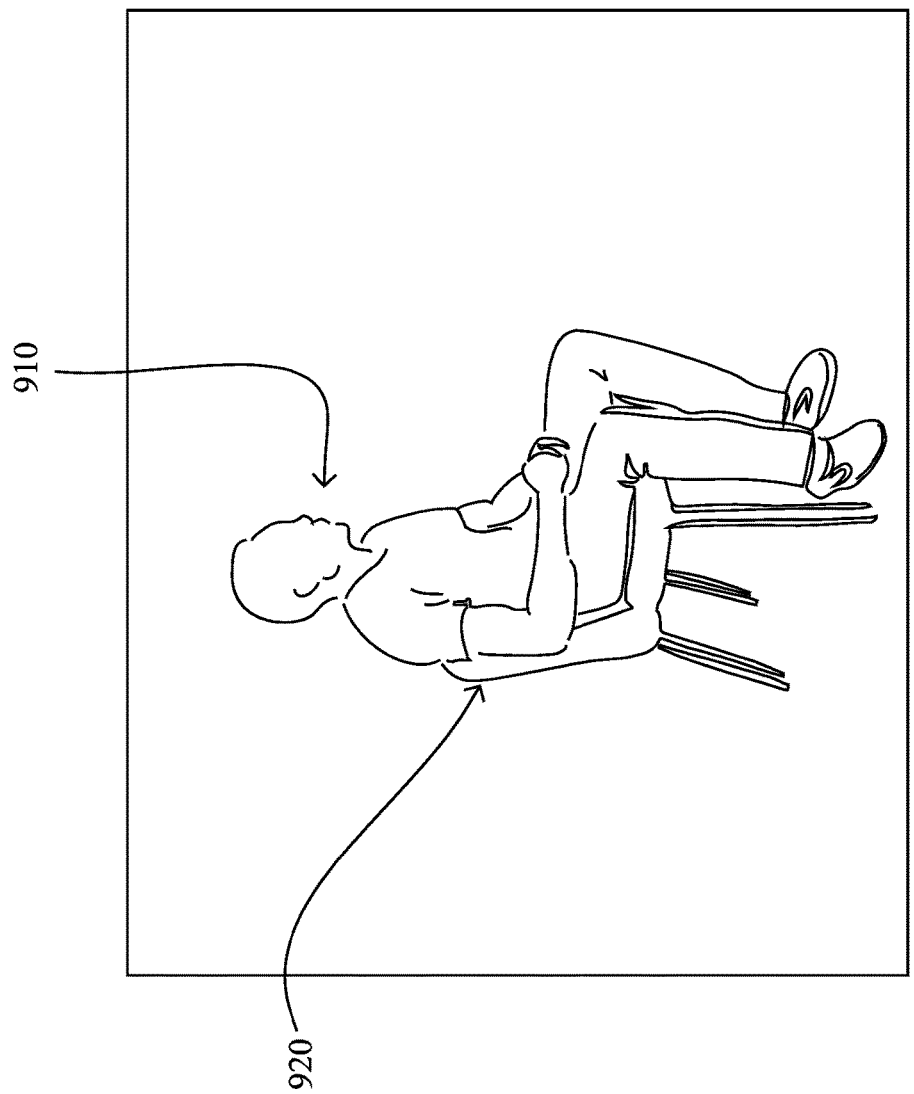

To demonstrate further, FIGS. 9A and 9B illustrate an example scenario in which reasoning engine-based architecture 1000 is applied to perform real-time adaptation of a holographic image based on a physical environment, as referenced above. The non-adapted holographic image 900, which in this example is a visible rendering of a remotely located meeting participant (e.g., remote participant 820), may be projected in a physical environment (e.g., physical environment 810) that includes a chair 920. One or more projection devices (e.g., holographic image projector 1080) in the physical environment may project the non-adapted holographic image 900 on or above the chair 920 so as to create the appearance that the remote participant is actually sitting on the chair which is located in the physical environment.

However, as shown in FIG. 9A, the holographic image 900, which has not been adapted to the physical environment in which it is projected, may suffer from a misalignment 930 between the projected image 900 and the chair 920. The misalignment 930 in this case creates an effect such that the non-adapted holographic image 900 appears to be hovering over a surface of the chair 920, which detracts from the overall realism of the hologram projection, as would be appreciated. Here, the holographic image 900 has not been correlated or adapted with the physical environment in terms of size, position, physical state, and so on, nor can the holographic image 900 realistically react in response to real-time events or changes occurring in the physical environment since the remote environment, where holographic image 900 is generated, is unaware of said events or changes in the physical environment.

The techniques herein address these issues by adapting the holographic image 900 to the physical environment, using reasoning engine-generated inferences, in the manner described in detail above. For instance, the holographic image 900 may be adapted in terms of its dimensions and position with respect to the chair 920 in the physical environment. The remote environment from which holographic image 900 is derived may perform the aforementioned adaptation computations on the holographic image 900, based upon inferences made by a reasoning engine, e.g., DFRE process 248, regarding aspects of the physical environment. As a result of the hologram adaptation, the gap between the holographic image 900 and the chair 920 caused by the misalignment 930 may be eliminated, resulting in the adapted holographic image 910 shown in FIG. 9B. As shown, the adapted holographic image 910 and the chair 920 are dimensionally and positionally aligned with each other.

Figure 11:
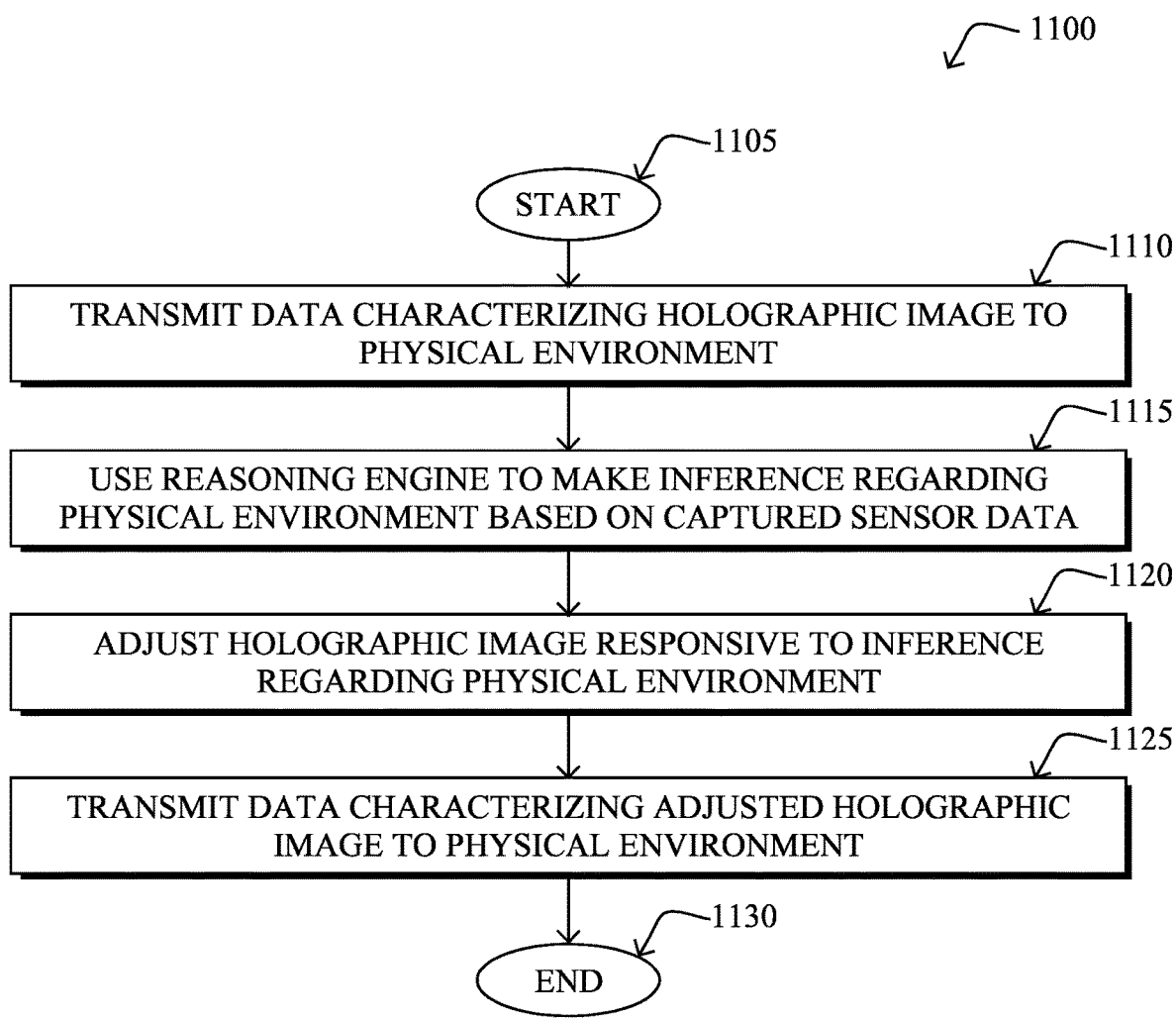
FIG. 11 illustrates an example simplified procedure for using a reasoning engine to perform real-time adaptation of a holographic image based on a physical environment.

FIG. 11 illustrates an example simplified procedure for using a reasoning engine to perform real-time adaptation of a holographic image based on a physical environment, in accordance with one or more embodiments described herein. For example, a non-generic, specifically configured device (e.g., device 200) may perform procedure 1100 by executing stored instructions (e.g., DFRE process 248). The procedure 1100 may start at step 1105, and continues to step 1110, where, as described in greater detail above, the device may transmit data characterizing a holographic image to a physical environment. A visible rendering of the holographic image may then be created in the physical environment, using any suitable techniques known in the art, such as, for example, laser-based projection, Pepper's ghost effect, projection screens, and so forth. In some embodiments, the holographic image may be generated in a remote environment prior to transmitting the data characterizing the holographic image to the physical environment. For instance, the holographic image may be a representation of a remote meeting participant located in the remote environment. Upon creating the visible rendering of the holographic image in the physical environment, it can appear as if the remote meeting participant is physically present in the physical environment along with other persons and/or objects physically present in the physical environment.

At step 1115, as detailed above, a reasoning engine may be used to make an inference regarding a state of the physical environment based on sensor data captured in the physical environment. The sensor data may be indicative of one or more real-time characteristics of the physical environment. For instance, the reasoning engine, such as the deep fusion reasoning engine (e.g., DFRE process 248) described in detail above, may be applied to the captured sensor data to generate an inference regarding an interaction between the visible rendering of the holographic image in the physical environment and a physical object in the physical environment. The interaction may involve a physical object (e.g., a person, a chair, a desk, a lectern, etc.) in the physical environment coming into contact with the visible rendering of the holographic image, as an example. In response, the device may generate a feedback event in the physical environment corresponding to the interaction. In the specific case of a physical object in the physical environment coming into contact with the visible rendering of the holographic image, the feedback event may mimic a physical sensation that would result from contact between the physical object in the physical environment and a physical presence of the holographic image in the physical environment. In some embodiments, the physical sensation may comprise haptic feedback produced via ultrasonic waves, as explained above.

At step 1120, as detailed above, the device may adjust the holographic image responsive to the reasoning engine-generated inference regarding the state of the physical environment. For instance, the device may detect a change in the state of the physical environment based on the sensor data captured in the physical environment and the aforementioned inference(s) generated by the reasoning engine. The device may then adjust (i.e., adapt) the holographic image according to the change in the state of the physical environment. The change in the state of the physical environment may include, for example, a person taking a cup of tea, a ball rolling on a desk, lights being turned on, $CO_2$ levels increasing or decreasing, a person entering or leaving the room, and so forth. In some embodiments, the reasoning engine may be used to identify patterns within the sensor data captured in the physical environment in order to detect changes in the physical environment state. In further embodiments, the reasoning engine may be utilized to construct a geo-spatial model of the physical environment based on the captured sensor data. In such case, when a change in the state of the physical environment is detected, the holographic image data may be adjusted accordingly, in addition to updating the geo-spatial model of the physical environment to ensure that the model accurately reflects the real-time condition of the physical environment. Adjustment (or adaptation) of the holographic image according to the physical environment may be performed using the geo-spatial model. In yet further embodiments, the holographic image may be adjusted to reflect a changed state of the hologram itself. For instance, if the reasoning engine generates an inference indicative of an interaction in the physical environment that would change the state of the holographic image (e.g., a hologram of a globe is spun by a user locally present in the physical environment), the device may adjust the holographic image to reflect the changed state.

At step 1125, as detailed above, the device may transmit data characterizing the adjusted holographic image to the physical environment. A visible rendering of the adjusted holographic image may then be created in the physical environment. As would be appreciated, the adjustments made to the holographic image based on aspects of the physical environment may effectively adapt the holographic image to real-time characteristics of the physical environment, thereby enhancing the realism of the projection. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein, therefore, enable reasoning engine-based real-time adaptation of holographic imaging based on a physical environment. In some aspects, the techniques herein may enhance the realism and immersiveness of a "phygital" meeting which blends digital elements with physical elements in a physical environment. Rather than merely superimposing digital elements over physical elements, essentially yielding two disconnected and uncorrelated realities, the techniques herein may adapt a holographic image model, including the model's size, position, lighting, coloration, and so on, based on real-time characteristics of the physical environment in which the holographic image is projected. In further aspects, the techniques herein may leverage inferences made by a reasoning engine based on sensor data captured in the physical environment to detect dimensional, behavioral, and/or environmental changes in the physical environment, allowing for the holographic image to be continuously calibrated and updated responsive to such changes.

While there have been shown and described illustrative embodiments that provide for a reasoning engine-based real-time adaptation of holographic imaging to a physical environment, it is to be understood that various other adaptations and modifications may be made within the spirit and scope of the embodiments herein. For example, while certain embodiments are described herein with respect to holographic images, particularly, the techniques can be extended without undue experimentation to other varieties of digital elements, such as augmented reality images, virtual reality images, mixed reality images, etc., as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
transmitting, by a device, data characterizing a holographic image to a physical environment, wherein a visible rendering of the holographic image is created in the physical environment;
using, by the device, a reasoning engine that uses a knowledge base to make an inference regarding a state of the physical environment based on sensor data captured in the physical environment indicative of one or more real-time characteristics of the physical environment, wherein the knowledge base comprises a structured representation of concepts modeled using symbolic, sub-symbolic, and conceptual layers, and includes relationships between the concepts based on dimensional similarity in a conceptual space;
adjusting, by the device, the holographic image responsive to the inference regarding the state of the physical environment; and
transmitting, by the device and to the physical environment, data characterizing the holographic image adjusted by the device, wherein a visible rendering of the holographic image adjusted by the device is created in the physical environment.

2. The method as in claim 1, further comprising:
generating, by the device, the holographic image prior to transmitting the data characterizing the holographic image to the physical environment.

3. The method as in claim 1, further comprising:
detecting, by the device and based in part on the inference regarding the state of the physical environment made using the reasoning engine, a change in the state of the physical environment based on the sensor data captured in the physical environment; and
adjusting, by the device, the holographic image according to the change in the state of the physical environment.

4. The method as in claim 3, wherein detecting the change in the state of the physical environment comprises:
using, by the device, the reasoning engine to identify patterns within the sensor data captured in the physical environment.

5. The method as in claim 1, wherein adjusting the holographic image comprises:
using, by the device, the reasoning engine to construct a geo-spatial model of the physical environment based on the sensor data captured in the physical environment; and
adjusting, by the device, the holographic image based on the geo-spatial model of the physical environment.

6. The method as in claim 5, further comprising:
detecting, by the device and based in part on the inference regarding the state of the physical environment made using the reasoning engine, a change in the state of the physical environment based on the sensor data captured in the physical environment; and
updating, by the device, the geo-spatial model of the physical environment to reflect the change in the state of the physical environment.

7. The method as in claim 1, further comprising:
using, by the device, the reasoning engine to make an inference regarding an interaction between the visible rendering of the holographic image in the physical environment and a physical object in the physical environment; and
generating, by the device and based in part on the inference regarding the interaction made using the reasoning engine, a feedback event in the physical environment corresponding to the interaction.

8. The method as in claim 7, further comprising:
detecting, by the device and based in part on the inference regarding the interaction made using the reasoning engine, that the physical object in the physical environment comes into contact with the visible rendering of the holographic image in the physical environment, wherein the feedback event mimics a physical sensation that would result from contact between the physical object in the physical environment and a physical presence of the holographic image in the physical environment.

9. The method as in claim 7, wherein the feedback event comprises haptic feedback using ultrasound.

10. The method as in claim 1, further comprising:
using, by the device, the reasoning engine to make an inference regarding an interaction between the visible rendering of the holographic image in the physical environment and a physical object in the physical environment, wherein the interaction would cause a change of a physical state of the holographic image in the physical environment; and
adjusting, by the device, the holographic image to reflect the physical state of the holographic image in the physical environment.

11. An apparatus, comprising:
a network interface to communicate with a computer network;
a processor coupled to the network interface and configured to execute one or more processes; and
a memory configured to store a process that is executed by the processor, the process when executed configured to:
transmit data characterizing a holographic image to a physical environment, wherein a visible rendering of the holographic image is created in the physical environment;
use a reasoning engine that uses a knowledge base to make an inference regarding a state of the physical environment based on sensor data captured in the physical environment indicative of one or more real-time characteristics of the physical environment, wherein the knowledge base comprises a structured representation of concepts modeled using symbolic, sub-symbolic, and conceptual layers, and includes relationships between the concepts based on dimensional similarity in a conceptual space;
adjust the holographic image responsive to the inference regarding the state of the physical environment; and
transmit, to the physical environment, data characterizing the holographic image that has been adjusted, wherein a visible rendering of the holographic image that has been adjusted is created in the physical environment.

12. The apparatus as in claim 11, wherein the process when executed is further configured to:
generate the holographic image prior to transmitting the data characterizing the holographic image to the physical environment.

13. The apparatus as in claim 11, wherein the process when executed is further configured to:
detect, based in part on the inference regarding the state of the physical environment made using the reasoning engine, a change in the state of the physical environment based on the sensor data captured in the physical environment; and adjust the holographic image according to the change in the state of the physical environment.

14. The apparatus as in claim 13, wherein the apparatus detects the change in the state of the physical environment by:
    using the reasoning engine to identify patterns within the sensor data captured in the physical environment.

15. The apparatus as in claim 11, wherein the apparatus adjusts the holographic image by:
    using the reasoning engine to construct a geo-spatial model of the physical environment based on the sensor data captured in the physical environment; and
    adjusting the holographic image based on the geo-spatial model of the physical environment.

16. The apparatus as in claim 15, wherein the process when executed is further configured to:
    detect, based in part on the inference regarding the state of the physical environment made using the reasoning engine, a change in the state of the physical environment based on the sensor data captured in the physical environment; and
    update the geo-spatial model of the physical environment to reflect the change in the state of the physical environment.

17. The apparatus as in claim 11, wherein the process when executed is further configured to:
    use the reasoning engine to make an inference regarding an interaction between the visible rendering of the holographic image in the physical environment and a physical object in the physical environment; and
    generate, based in part on the inference regarding the interaction made using the reasoning engine, a feedback event in the physical environment corresponding to the interaction.

18. The apparatus as in claim 17, wherein the process when executed is further configured to:
    detect, based in part on the inference regarding the interaction made using the reasoning engine, that the physical object in the physical environment comes into contact with the visible rendering of the holographic image in the physical environment,
    wherein the feedback event mimics a physical sensation that would result from contact between the physical object in the physical environment and a physical presence of the holographic image in the physical environment.

19. The apparatus as in claim 11, wherein the process when executed is further configured to:
    use the reasoning engine to make an inference regarding an interaction between the visible rendering of the holographic image in the physical environment and a physical object in the physical environment, wherein the interaction would cause a change of a physical state of the holographic image in the physical environment; and
    adjust the holographic image to reflect the physical state of the holographic image in the physical environment.

20. A tangible, non-transitory, computer-readable medium storing program instructions that cause a device to execute a process comprising:
    transmitting, by the device, data characterizing a holographic image to a physical environment, wherein a visible rendering of the holographic image is created in the physical environment;
    using, by the device, a reasoning engine that uses a knowledge base to make an inference regarding a state of the physical environment based on sensor data captured in the physical environment indicative of one or more real-time characteristics of the physical environment, wherein the knowledge base comprises a structured representation of concepts modeled using symbolic, sub-symbolic, and conceptual layers, and includes relationships between the concepts based on dimensional similarity in a conceptual space;
    adjusting, by the device, the holographic image responsive to the inference regarding the state of the physical environment; and
    transmitting, by the device and to the physical environment, data characterizing the holographic image adjusted by the device, wherein a visible rendering of the holographic image adjusted by the device is created in the physical environment.

* * * * *